US012464595B2

United States Patent
Oteri et al.

(10) Patent No.: US 12,464,595 B2
(45) Date of Patent: Nov. 4, 2025

(54) RADIO WAKEUP RADIO

(71) Applicant: Apple Inc., Cupertino, CA (US)

(72) Inventors: Oghenekome Oteri, San Diego, CA (US); Seyed Ali Akbar Fakoorian, San Diego, CA (US); Hong He, Cupertino, CA (US); Haitong Sun, Cupertino, CA (US); Weidong Yang, San Diego, CA (US); Chunhai Yao, Beijing (CN); Chunxuan Ye, San Diego, CA (US); Sigen Ye, San Diego, CA (US); Wei Zeng, San Diego, CA (US); Dawei Zhang, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/908,839

(22) PCT Filed: Sep. 6, 2021

(86) PCT No.: PCT/CN2021/116644
§ 371 (c)(1),
(2) Date: Sep. 1, 2022

(87) PCT Pub. No.: WO2023/029029
PCT Pub. Date: Mar. 9, 2023

(65) Prior Publication Data
US 2024/0196469 A1 Jun. 13, 2024

(51) Int. Cl.
*H04W 76/27* (2018.01)
*H04W 52/02* (2009.01)

(52) U.S. Cl.
CPC ....... *H04W 76/27* (2018.02); *H04W 52/0229* (2013.01)

(58) Field of Classification Search
CPC . H04W 68/02; H04W 88/06; H04W 52/0235; Y02D 30/70
See application file for complete search history.

(56) References Cited

U.S. PATENT DOCUMENTS 10,492,142 B2    11/2019   Gupta
2018/0288703 A1   10/2018   Sun
(Continued)

FOREIGN PATENT DOCUMENTS

CN    110740498    1/2020
CN    111512677    8/2020
(Continued)

OTHER PUBLICATIONS

International Search Report and Written Opinion for PCT/CN2021/116644; 9 pages; Apr. 7, 2022.
(Continued)

*Primary Examiner* — Diane D Mizrahi
(74) *Attorney, Agent, or Firm* — Kowert, Hood, Munyon, Rankin & Goetzel, P.C.

(57) ABSTRACT

Apparatuses, systems, and methods for a wakeup radio in a wireless communication system, e.g., in 5G NR systems and beyond. An RRC state is introduced to support a wakeup radio/, including defining transition mechanisms to/from existing RRC states. Further, signaling is introduced to activate a wakeup radio/activate an RRC low power state. Additionally, a bandwidth part framework for a wakeup signal is defined in which a base station may configure one or more time/frequency resources or a wakeup signal for a wakeup radio. In addition, various mechanisms are introduced to switch a wakeup radio on as well as to switch a wakeup radio off. Also, mechanisms are introduced for multiplexing multiple wakeup signals in a time/frequency (Continued)

resource, configuring a wakeup signal bandwidth, and configuring which beam a wakeup signal may be received on.

20 Claims, 33 Drawing Sheets

(56) References Cited

U.S. PATENT DOCUMENTS

2020/0092818 A1    3/2020  Jiang
2020/0221306 A1*   7/2020  Chen .................... H04W 16/14

FOREIGN PATENT DOCUMENTS

| CN | 113170393  | 7/2021 |
| WO | 2018175760 | 9/2018 |
| WO | 2021160471 | 8/2021 |

OTHER PUBLICATIONS

Intel Corporation "DL Power Consumption Reduction for efeMTC"; 3GPP TSG RAN WG1 Meeing #88bis R1-1704693; Spokane, USA; 6 pages; Apr. 7, 2017.

Extended European Search Report for EP 21955561.2; Mar. 27, 2025.

* cited by examiner

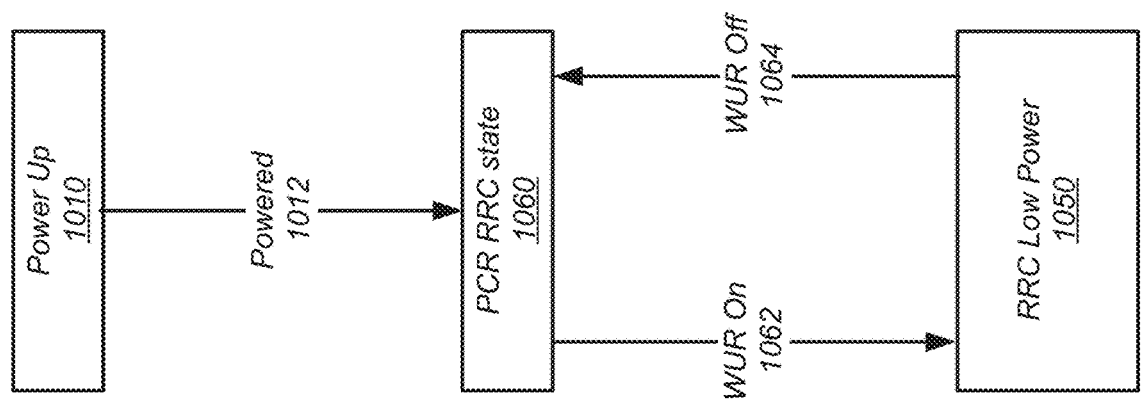

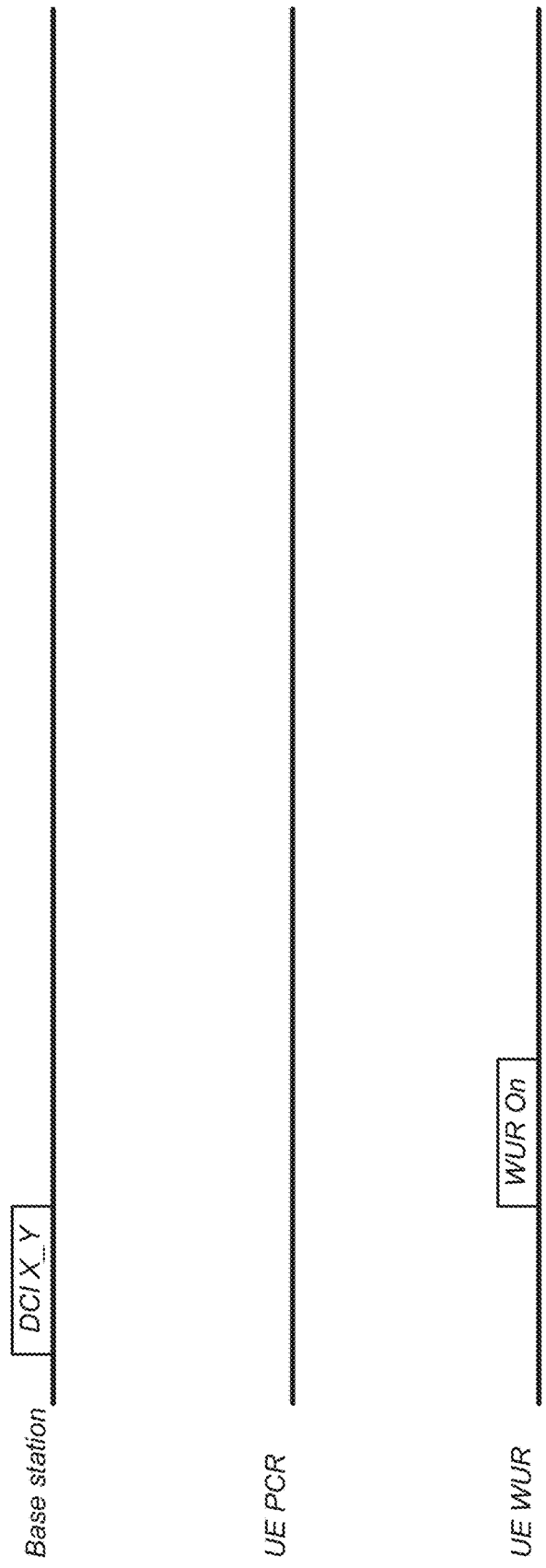

RADIO WAKEUP RADIO

PRIORITY CLAIM

This application is a national phase entry of PCT application number PCT/CN2021/116644, entitled "NEW RADIO WAEKUP RADIO" filed Sep. 6, 2021, which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for a wakeup radio in a wireless communication system, e.g., in 5G NR systems and beyond.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS) and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for a wakeup radio in a wireless communication system, e.g., in 5G NR systems and beyond.

For example, in some instances, an additional radio resource control (RRC) state may be introduced to support a wakeup radio and/or wakeup signal, including defining transition mechanisms between an RRC low power state (e.g., a low power and/or ultra-low power RRC state in which a wakeup radio is active) and existing RRC states (e.g., idle, connected, and/or inactive in which a primary communication radio, such as a primary cellular radio is active). As another example, in some instances, various signaling (e.g., physical layer, MAC CE signaling, and/or RRC signaling) may be introduced to activate a wakeup radio and/or activate an RRC low power state. As a further example, in some instances, a bandwidth part framework for a wakeup signal may be defined in which a base station may configure one or more time and/or frequency resources or a wakeup signal for a wakeup radio. As yet another example, in some instances, various mechanisms may be introduced to trigger a UE to switch a wakeup radio on (and switch a primary communication radio off) as well as to trigger a UE to switch a wakeup radio off (and switch a primary communication radio on). Further examples include mechanisms for multiplexing multiple wakeup signals in a time/frequency resource as well as configuring a wakeup signal bandwidth (e.g., based on a signal to noise ratio of a UE) and configuring which beam (e.g., beam scheduling) a wakeup signal may be received on.

In some embodiments, a UE may operate in a first RRC state (e.g., an RRC idle state, an RRC inactive state, and/or an RRC connected state) in which a primary communication radio of the UE may be powered on and a wakeup radio of the UE may be powered off. Additionally, the UE may receive, while operating in the first RRC state, a signal indicating a transition to a second RRC state (e.g., an RRC low power state) in which the primary communication radio of the UE may be powered off and the wakeup radio of the UE may be powered. The signal may be a physical layer signal, a medium access control (MAC) control element (CE), and/or an RRC message. Further, the UE may transition to the second RRC state based on receipt of the signal. Thus, the UE may power on the wakeup radio and power off the primary communication radio.

In some embodiments, a UE may operate in a first RRC state (e.g., an RRC idle state, an RRC inactive state, and/or an RRC connected state) in which a primary communication radio of the UE may be powered on and a wakeup radio of the UE may be powered off. Additionally, the UE may receive, from a base station, a configuration of one or more time and frequency resources for the wakeup radio to monitor. Further, the UE may monitor, after transitioning to a second RRC state (e.g., an RRC low power state) in which the primary communication radio of the UE may be powered off and the wakeup radio of the UE may be powered on, one or more bandwidth parts included in and/or specified by the one or more time and frequency resources.

In some embodiments, may operate in a first RRC state (e.g., an RRC idle state, an RRC inactive state, and/or an RRC connected state) in which a primary communication radio of the UE may be powered on and a wakeup radio of the UE may be powered off. Additionally, the UE may monitor, in a group common physical downlink control channel (PDCCH), for a first downlink control indicator (DCI) format for a duration of time. Further, the UE may transition to the second RRC state, e.g., based on the monitoring. In other words, upon detection and decoding of the first DCI format, the UE may transition to the second RRC state. Thus, the UE may power on the wakeup radio and power off the primary communication radio.

In some embodiments, a UE may monitor a configured bandwidth part for a wakeup signal while operating in a low power RRC state in which the primary communication radio of the UE may be powered off and the wakeup radio of the UE may be powered on. Additionally, the UE may, upon receipt of the wakeup signal, transition to another RRC state (e.g., an RRC idle state, an RRC inactive state, and/or an RRC connected state) in which a primary communication radio of the UE may be powered on and a wakeup radio of the UE may be powered off.

In some embodiments, a UE may operate in a first RRC state (e.g., an RRC idle state, an RRC inactive state, and/or an RRC connected state) in which a primary communication radio of the UE may be powered on and a wakeup radio of the UE may be powered off. Additionally, the UE may receive, while operating in the first RRC state, a signal multiplexed with one or more other signals in a time and frequency resource and indicating a transition to a second RRC state (e.g., an RRC low power state) in which the primary communication radio of the UE may be powered off and the wakeup radio of the UE may be powered on. Further, the UE may transition to the second RRC state based on receipt of the signal. Thus, the UE may power on the wakeup radio and power off the primary communication radio.

In some embodiments, a UE may operate in a first RRC state (e.g., an RRC idle state, an RRC inactive state, and/or an RRC connected state) in which a primary communication radio of the UE may be powered on and a wakeup radio of the UE may be powered off. Additionally, the UE may report, to a base station, a signal to noise ratio (SNR). Further, the UE may receive, from the base station, a configuration for a bandwidth of a signal indicating a transition to a second RRC state where the bandwidth of the signal may be based on the SNR reported by the UE. In addition, the UE may monitor the bandwidth, while operating in the first RRC state, for the signal.

In some embodiments, a UE may receive, from a base station, a beam schedule for a wakeup signal. Additionally, the UE may monitor, while operating in a low power RRC state in which the primary communication radio of the UE may be powered off and the wakeup radio of the UE may be powered on, for a wakeup signal, e.g., based on the beam schedule. Further, the UE may, upon receipt of the wakeup signal, transition to another RRC state (e.g., an RRC idle state, an RRC inactive state, and/or an RRC connected state) in which a primary communication radio of the UE may be powered on and a wakeup radio of the UE may be powered off.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 10A and 10B illustrate examples of RRC state machines that may be implemented by a UE, according to some embodiments.

FIGS. 12A, 12B, and 12C illustrate examples of various schemes for wakeup radio monitoring, according to some embodiments.

FIGS. 16-19 illustrate examples of block diagrams for methods for configuring initial access communications, according to some embodiments.

Figure 1A:
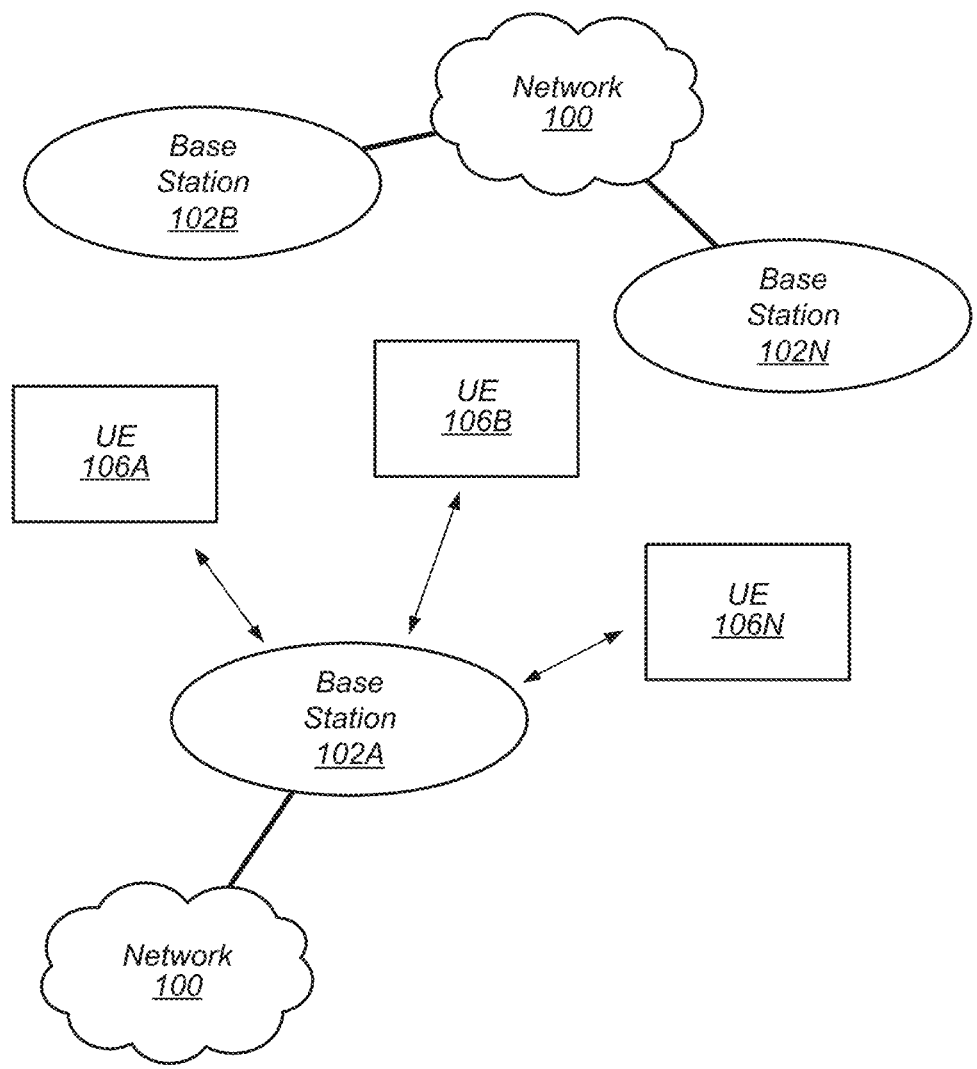
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
SIM: Subscriber Identity Module
eSIM: Embedded Subscriber Identity Module
IE: Information Element
CE: Control Element
MAC: Medium Access Control
SSB: Synchronization Signal Block
PDCCH: Physical Downlink Control Channel
PDSCH: Physical Downlink Shared Channel
RRC: Radio Resource Control

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.: a non-volatile memory such as a Flash, magnetic media, e.g., a hard drive, or optical storage: registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHZ to 20 MHZ. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
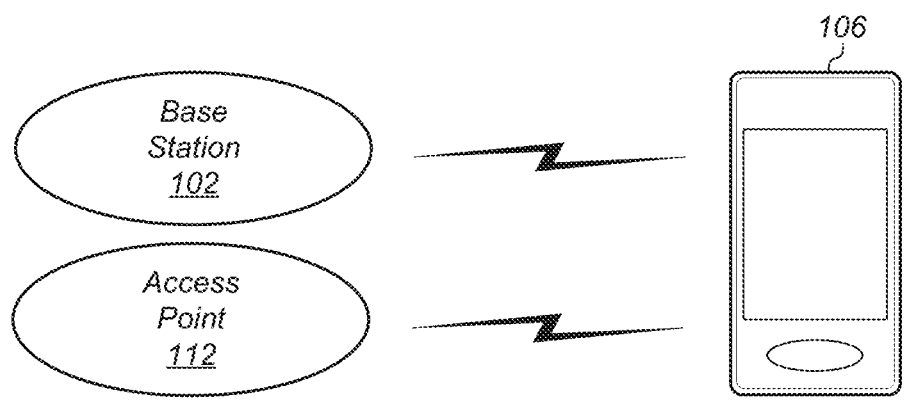
FIG. 1B illustrates an example of a base station and an access point in communication with a user equipment (UE) device, according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, IxEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., IxRTT, IxEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/IxEV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

Figure 2:
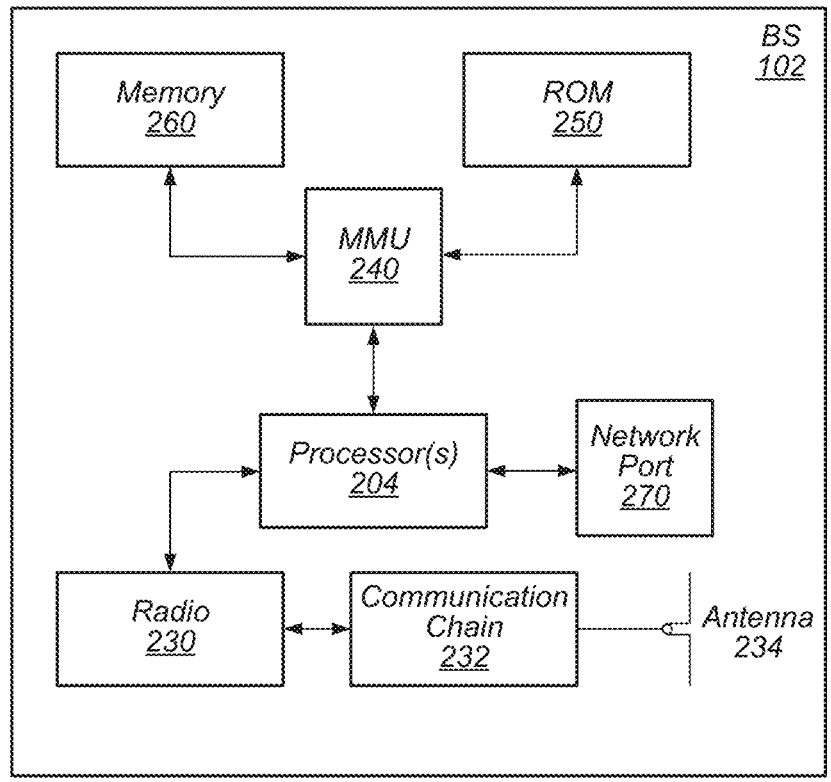
FIG. 2 illustrates an example block diagram of a base station, according to some embodiments.

FIG. 2: Block Diagram of a Base Station

Figure 3:
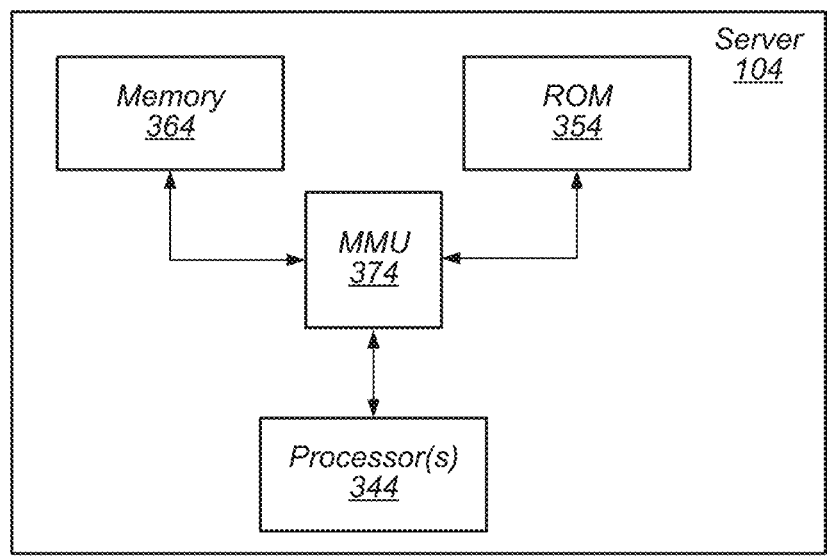
FIG. 3 illustrates an example block diagram of a server according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
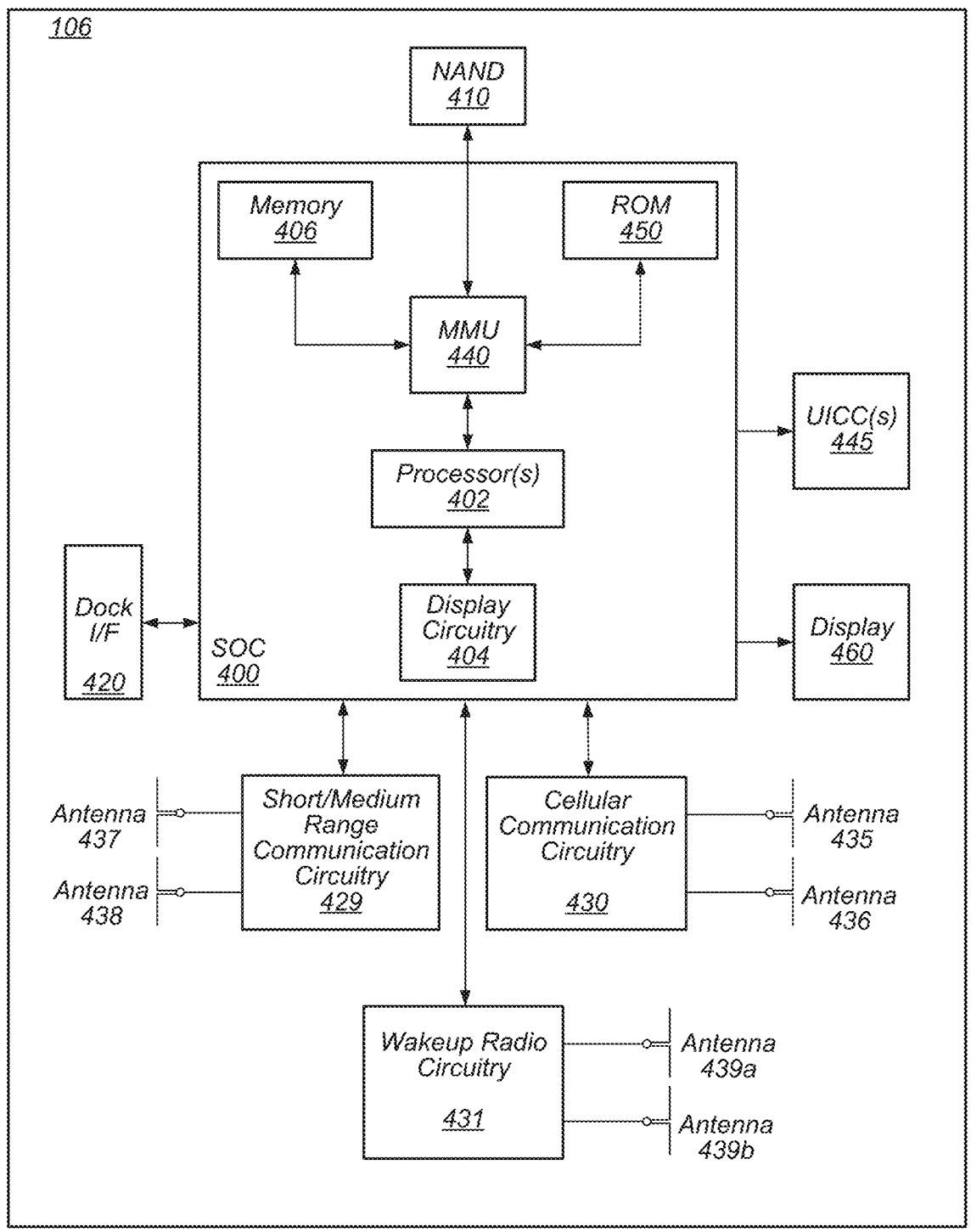
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively: directly or indirectly) to various other circuits of the communication device 106.

For example, the communication device 106 may include various types of memory (e.g., including NAND flash 410), an input/output interface such as connector I/F 420 (e.g., for connecting to a computer system: dock: charging station: input devices, such as a microphone, camera, keyboard: output devices, such as speakers: etc.), the display 460, which may be integrated with or external to the communication device 106, and cellular communication circuitry 430 such as for 5G NR, LTE, GSM, etc., short to medium range wireless communication circuitry 429 (e.g., Bluetooth™ and WLAN circuitry), and wakeup radio circuitry 431. In some embodiments, communication device 106 may include wired communication circuitry (not shown), such as a network interface card, e.g., for Ethernet.

The cellular communication circuitry 430 may couple (e.g., communicatively: directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively: directly or indirectly) to the antennas 435 and 436 in addition to, or instead of, coupling (e.g., communicatively: directly or indirectly) to the antennas 437 and 438. The wakeup radio circuitry 431 may also couple (e.g., communicatively; directly or indirectly) to one or more antennas, such as antennas 439a and 439b as shown. Alternatively, the wakeup radio circuitry 431 may couple (e.g., communicatively: directly or indirectly) to the antennas 435 and 436 in addition to, or instead of, coupling (e.g., communicatively: directly or indirectly) to the antennas 439a and 439b. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration. The wakeup radio circuitry 431 may include a wakeup receiver, e.g., wakeup radio circuitry 431 may be a wakeup receiver. In some instances, wakeup radio circuitry 431 may be a low power and/or ultra-low power wakeup receiver. In some instances, wakeup radio circuitry may only be powered/active when cellular communication circuitry 430 and/or the short to medium range wireless communication circuitry 429 are in a sleep/no power/inactive state. In some instances, wakeup radio circuitry 431 may monitor (e.g., periodically) a specific frequency/channel for a wakeup signal. Receipt of the wakeup signal may trigger the wakeup radio circuitry 431 to notify (e.g., directly and/or indirectly) cellular communication circuitry 430 to enter a powered/active state.

In some embodiments, as further described below, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus, the SIM(s) may be one or more removable smart cards (such as UICC cards, which are sometimes referred to as "SIM cards"), and/or the SIMS 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality: in such an embodiment, a single one of the SIM(s) may execute multiple SIM applications. Each of the SIMs may include components such as a processor and/or a memory:

instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs. two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 410 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VOLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for revocation and/or modification of user consent in MEC, e.g., in 5G NR systems and beyond, as further described herein. For example, the communication device 106 may be configured to perform methods for CORESET #0 configuration, SSB/CORESET #0 multiplexing pattern 1 for mixed SCS, time-domain ROs determination for 480 KHz/960 KHz SCSs, and RA-RNTI determination for 480 kHz/960 KHz SCSs.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
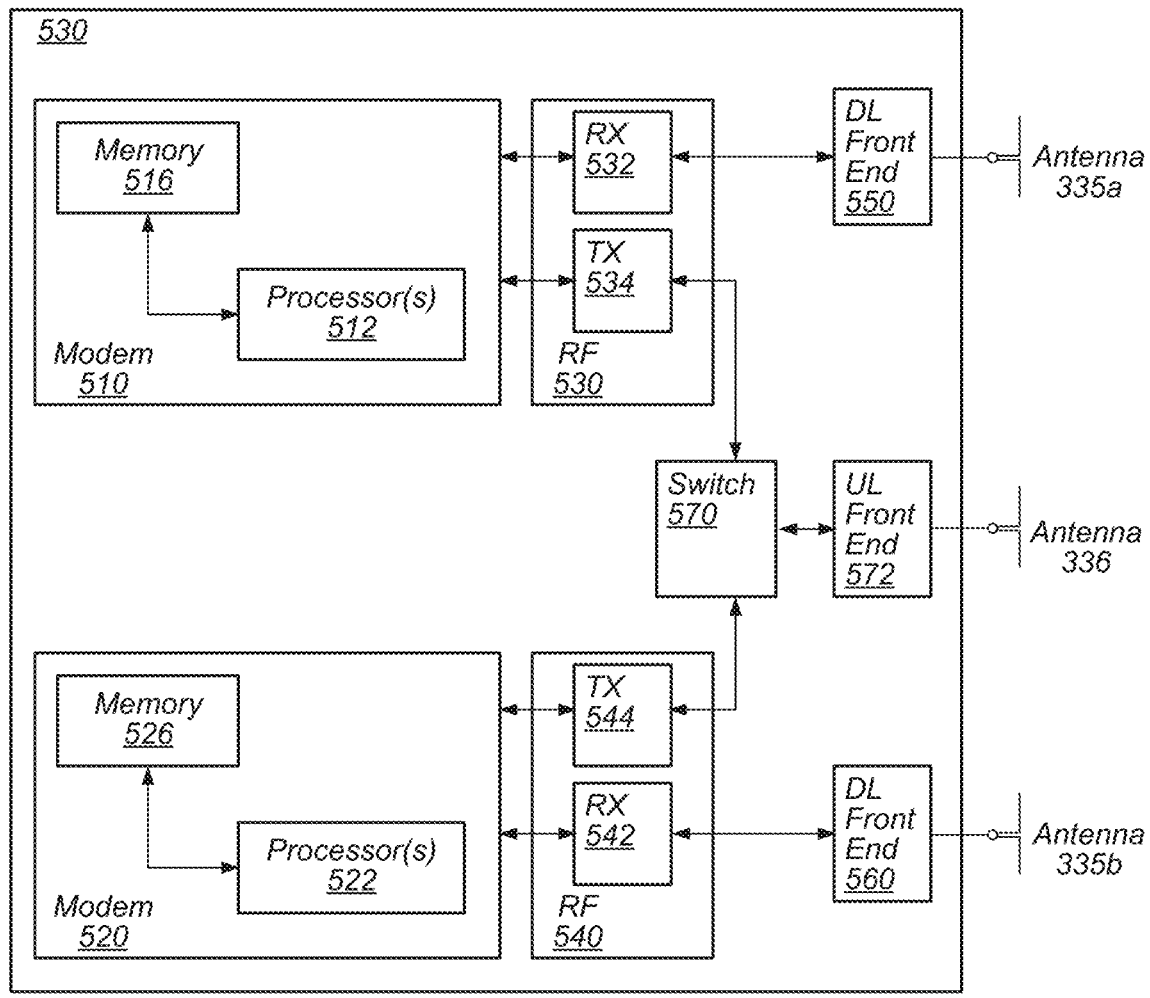
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively: directly or indirectly) to one or more antennas, such as antennas 435a-b and 436 as shown (in FIG. 4). In some embodiments, cellular communication circuitry 530 may include dedicated receive chains (including and/or coupled to, e.g., communicatively: directly or indirectly. dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520) may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530) may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520) may include one or more processors 522 and a memory 526 in communication with processors 522. Modem 520 may be in communication with an RF front end 540. RF front end 540) may include circuitry for transmitting and receiving radio signals. For example, RF front end 540) may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods for a wakeup radio in a wireless communication system, e.g., in 5G NR systems and beyond, as further described herein. For example, the cellular communication circuitry 530) may support an additional RRC state introduced to support a wakeup radio and/or wakeup signal, various signaling (e.g., physical layer, MAC CE signaling, and/or RRC signaling) to activate a wakeup radio and/or activate an RRC low power state, as well as various mechanisms to trigger a UE to switch a wakeup radio on (and switch cellular communication circuitry 530 off) as well as to trigger a UE to switch a wakeup radio off (and switch cellular communication circuitry 530 on).

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550), 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
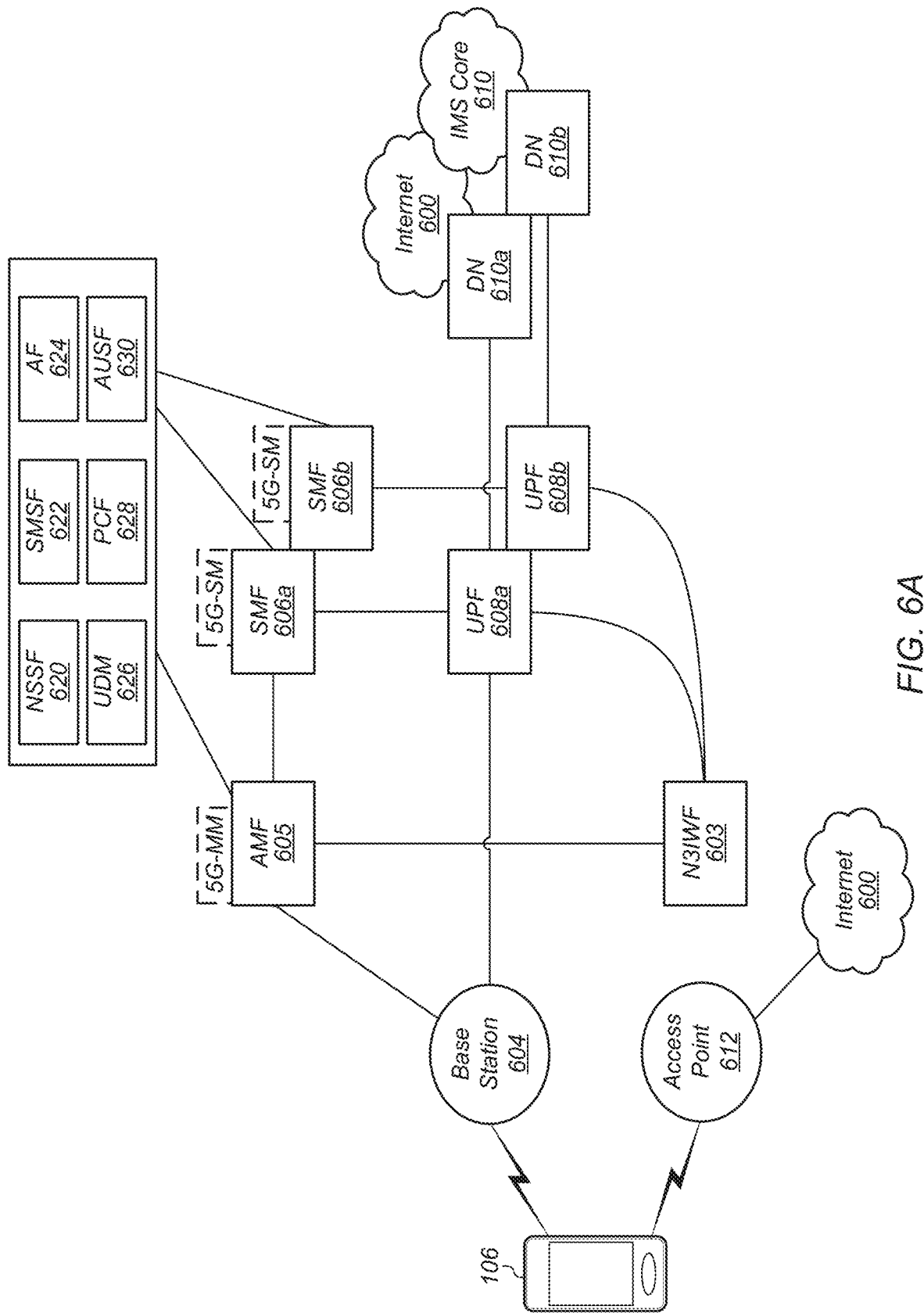
FIG. 6A illustrates an example of a 5G network architecture that incorporates both 3GPP (e.g., cellular) and non-3GPP (e.g., non-cellular) access to the 5G CN, according to some embodiments.
Figure 6B:
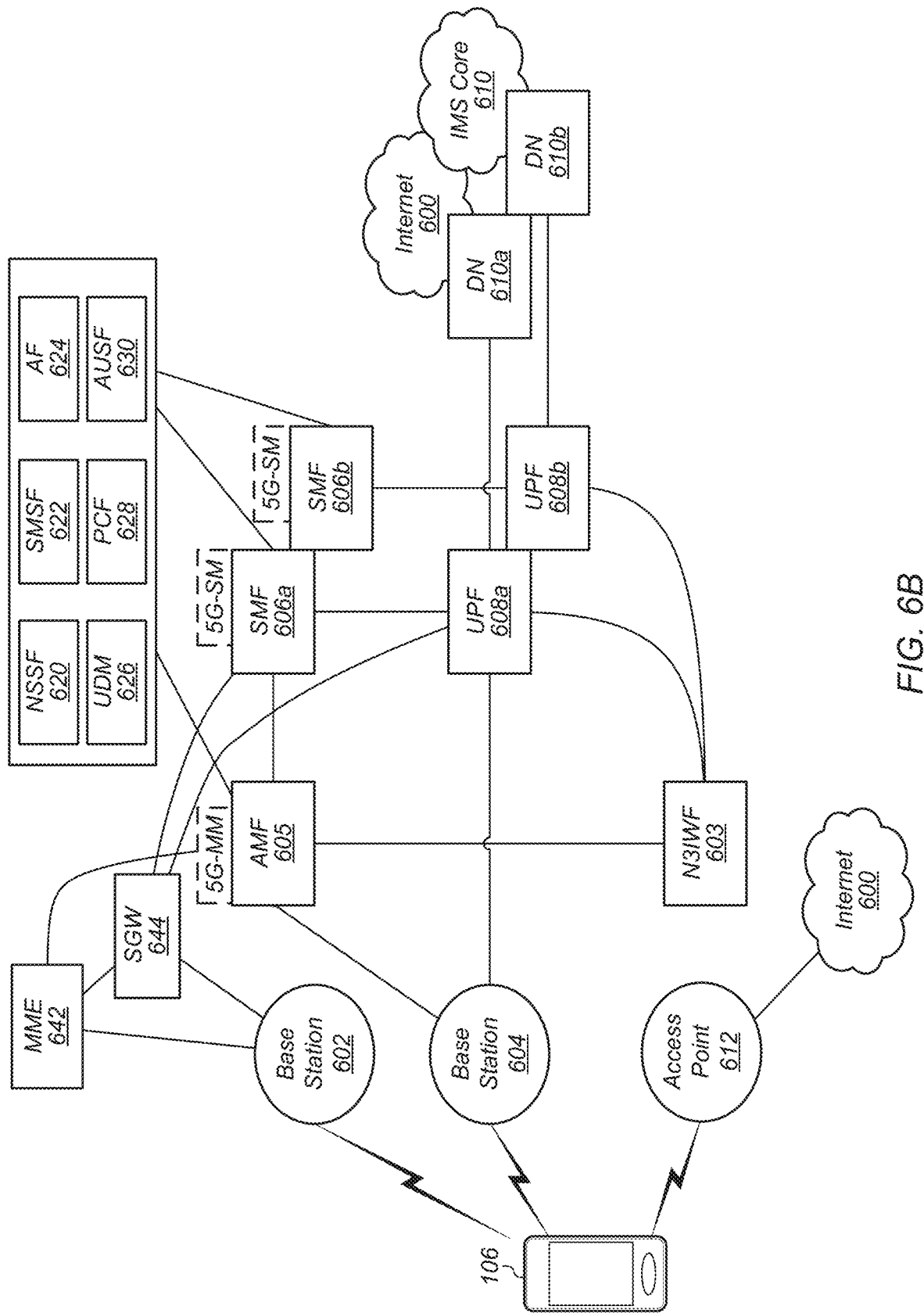
FIG. 6B illustrates an example of a 5G network architecture that incorporates both dual 3GPP (e.g., LTE and 5G NR) access and non-3GPP access to the 5G CN, according to some embodiments.
Figure 7:
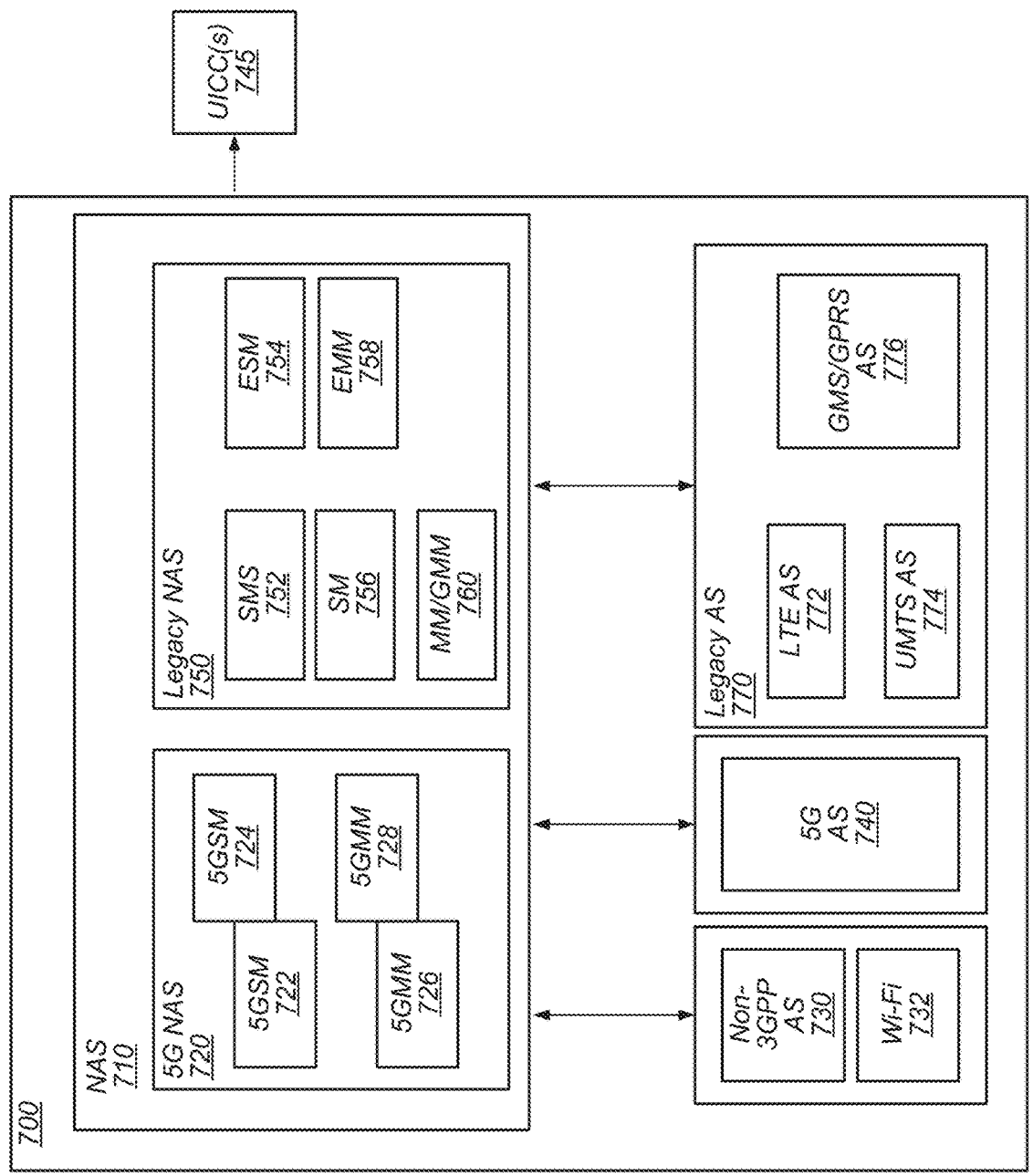
FIG. 7 illustrates an example of a baseband processor architecture for a UE, according to some embodiments.

FIGS. 6A, 6B and 7: 5G Core Network Architecture—Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 6A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. As shown, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606a and an SMF 606b of the 5G CN. The AMF 605 may be connected to (or in communication with) the SMF 606a. Further, the gNB 604 may in communication with (or connected to) a user plane function (UPF) 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606a and the UPF 608a. As shown, the AMF 605 may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF 606a and the SMF 606b of the 5G CN. The AMF 606 may be connected to (or in communication with) the SMF 606a. Further, the gNB 604 may in communication with (or connected to) the UPF 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and IMS core network 610.

Note that in various embodiments, one or more of the above-described network entities may be configured to perform methods to improve security checks in a 5G NR network, including mechanisms for a wakeup radio in a wireless communication system, e.g., in 5G NR systems and beyond, e.g., as further described herein.

FIG. 7 illustrates an example of a baseband processor architecture for a UE (e.g., such as UE 106), according to some embodiments. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above-described functional entities of the 5G NAS and/or 5G AS may be configured to perform methods for a wakeup radio in a wireless communication system, e.g., in 5G NR systems and beyond, e.g., as further described herein.

Wakeup Radio

In current implementations, UE battery life is an important aspect of a user's experience. Further, cellular systems, e.g., such as 5G NR systems, have increased complexity, flexibility, wider bandwidth, and higher data rate support as compared to 4G systems (e.g., LTE). These aspects of 5G NR systems may result in increased power consumption and probability of overheating. In addition, 5G NR has targeted higher energy efficiency than that of LTE, e.g., by optimizing time, frequency, spatial and device domain features of 5G NR.

Figure 8A:
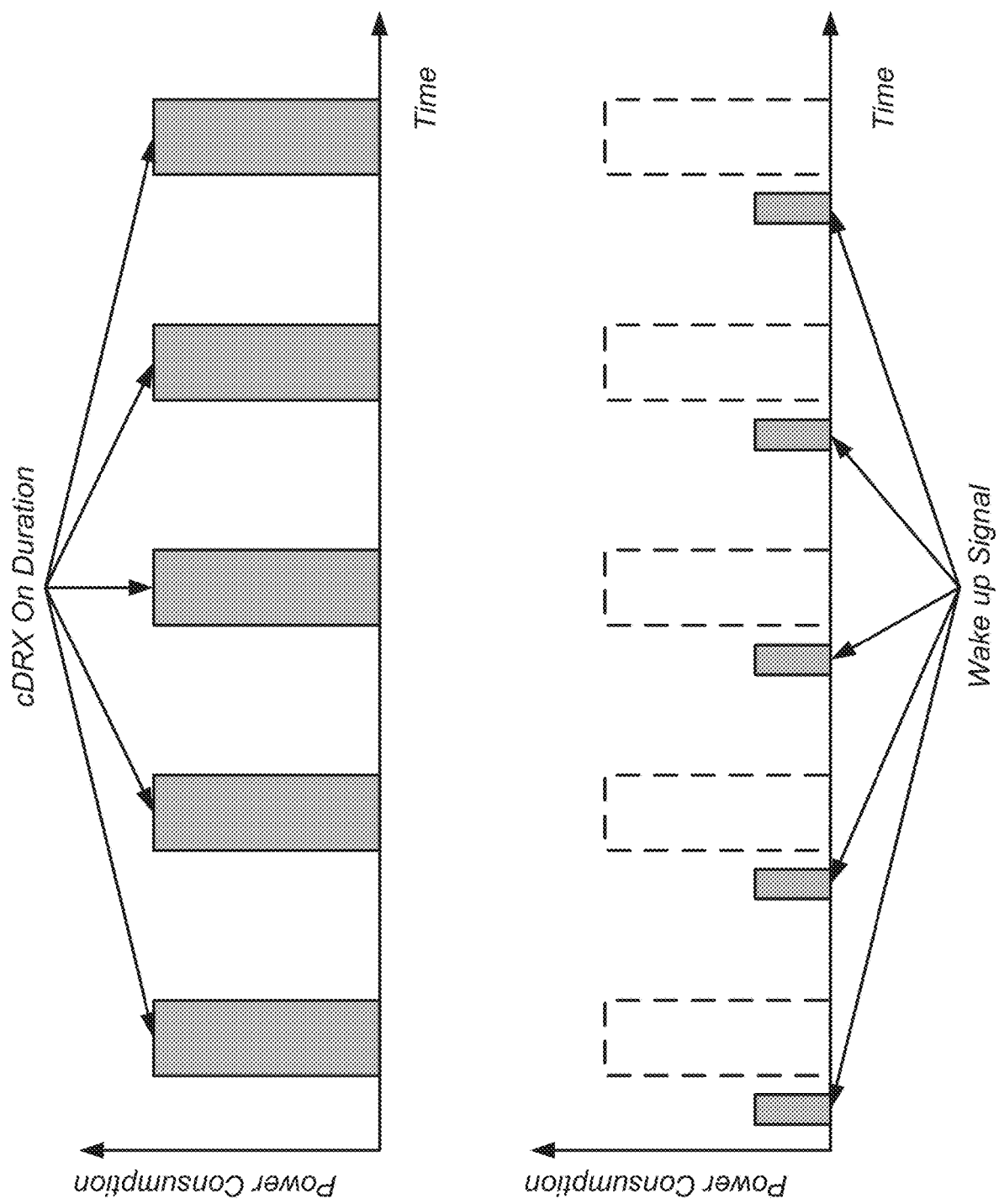
FIG. 8A illustrates an example of UE power consumption reduction via monitoring of a wakeup signal.
Figure 8B:
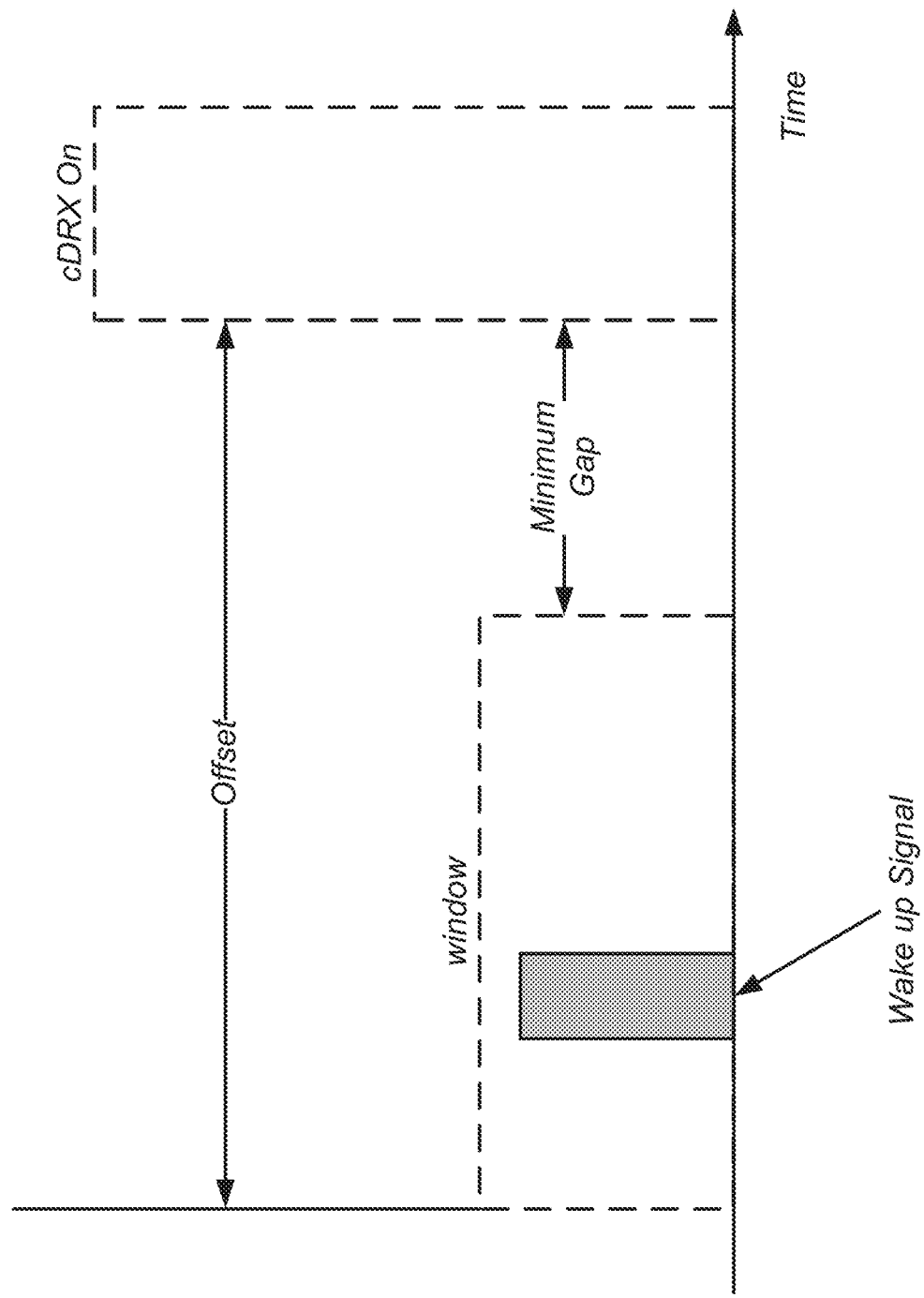
FIG. 8B illustrates an example of a dedicated search space for a wakeup signal.

In order to further conserve power, 5G NR Release 16 introduced a wakeup signal (WUS) in radio resource control (RRC) CONNECTED mode to indicate whether a UE wakes up or not in an upcoming CONNECTED mode discontinuous reception cycle (CDRX) on duration. Thus, when a UE receives a wakeup indication, the UE may monitor a physical downlink control channel (PDCCH) for a subsequent CDRX on duration. However, if the UE does not receive a wakeup indication, the UE may skip monitoring the PDCCH for a subsequent CDRX on duration. Thus, as illustrated by FIG. 8A, a UE is able to reduce power consumption by monitoring for a wakeup signal instead of monitoring the PDCCH for the CDRX on duration. As shown, the power consumption for monitoring the PDCCH for the CDRX on duration is greater than the power consumption for monitoring for the wakeup signal because of both the reduced power and duration required for monitoring for the wakeup signal as compared to monitoring the PDCCH for the CDRX on duration. Further, as illustrated by FIG. 8B, 5G NR Release 16 introduced a dedicated search space (window) for the wakeup signal as well as a minimum gap between the end of the dedicated search space and a start of a CDRX on duration. Further, as shown, 5G NR Release 16 introduced an offset from the start of a CDRX on duration to define a start of the dedicated search space. Additionally, the wakeup signal was defined as DCI format 2_6 which may be configured by a primary cell or a primary secondary cell. The DCI format 2_6 was further defined to contain UE specific configured power saving information for one or more UEs. Thus, a UE is configured to start monitoring for the DCI format 2_6 at the offset before the start of the CDRX on duration until the end of the configured window for monitoring. Note that this mechanism is only applicable for long CDRX and not applicable for short CDRX.

Figure 9:
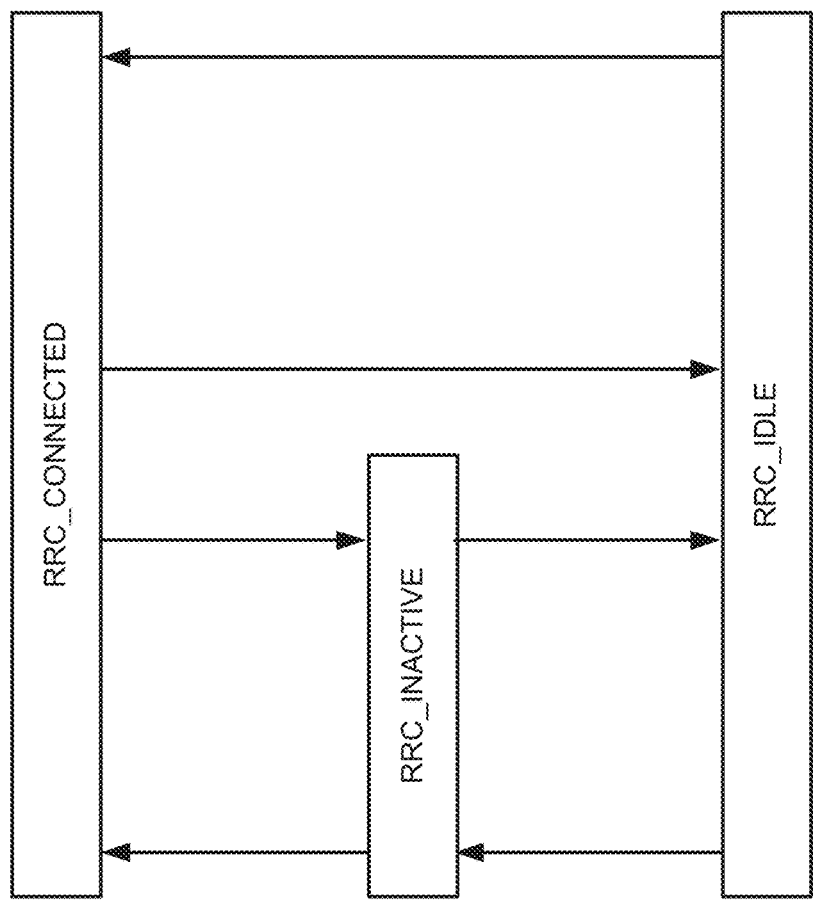
FIG. 9 illustrates examples of RRC states.

Additionally, as illustrated by FIG. 9, an RRC inactive state was introduced in which an RRC context and core network connection are maintained. The RRC inactive state saves all information needed for rapid resumption of a connection, including security, and allows for faster transition to an RRC connected state while allowing the UE to remain in a lower power state than required for RRC connected state. For comparison, in RRC connected state, the UE can transfer data, maintain and/or establish RRC context, and maintain a core network connection whereas in RRC inactive state, the UE cannot transfer data but does maintain and/or establish RRC context and maintain a core network connection. In RRC idle state, the UE cannot transfer data, does not maintain and/or establish RRC context and does not maintain a core network connection.

Further power savings enhancements are under discussion, including possible support of an ultra-low power UE wakeup signal via a wakeup radio/receiver. However, there are many considerations associated with introduction of such a wakeup radio/receiver (e.g., WUR) as well as an ultra-low power UE wakeup signal (WUS). For example, with regards to the WUR, how would a WUR fit within the existing NR framework and/or how would a WUR be turned on/off. As another example, with regards to the WUS, what would the bandwidth and multiplexing structure of the WUS be and/or how would a WUS be transmitted in a beam-based system.

Embodiments described herein provide systems, methods, and mechanisms for a wakeup signal in a cellular communications system. For example, in some instances, an additional radio resource control (RRC) state may be introduced to support a WUR/WUS, including defining transition mechanisms between an RRC WUR state (e.g., a low power and/or ultra-low power RRC state) and existing RRC states (e.g., idle, connected, and/or inactive). As another example, in some instances, various signaling (e.g., physical layer, MAC CE signaling, and/or RRC signaling) may be introduced to activate a WUR and/or activate an RRC WUR state. As a further example, in some instances, a bandwidth part (BWP) framework for a wakeup signal may be defined in which a base station may configure one or more time and/or frequency resources or a wakeup signal for a WUR. As yet another example, in some instances, various mechanisms may be introduced to trigger a UE to switch a WUR on (and switch a primary cellular radio and/or primary communications radio (PCR) off) as well as to trigger a UE to switch a WUR off (and switch a PCR on). Further examples include mechanisms for multiplexing multiple WUSs in a time/frequency resource as well as configuring a WUS bandwidth (e.g., based on a signal to noise ratio (SNR) of a UE, such as UE 106) and configuring which beam (e.g., beam scheduling) a WUS may be received on.

Figure 10A:
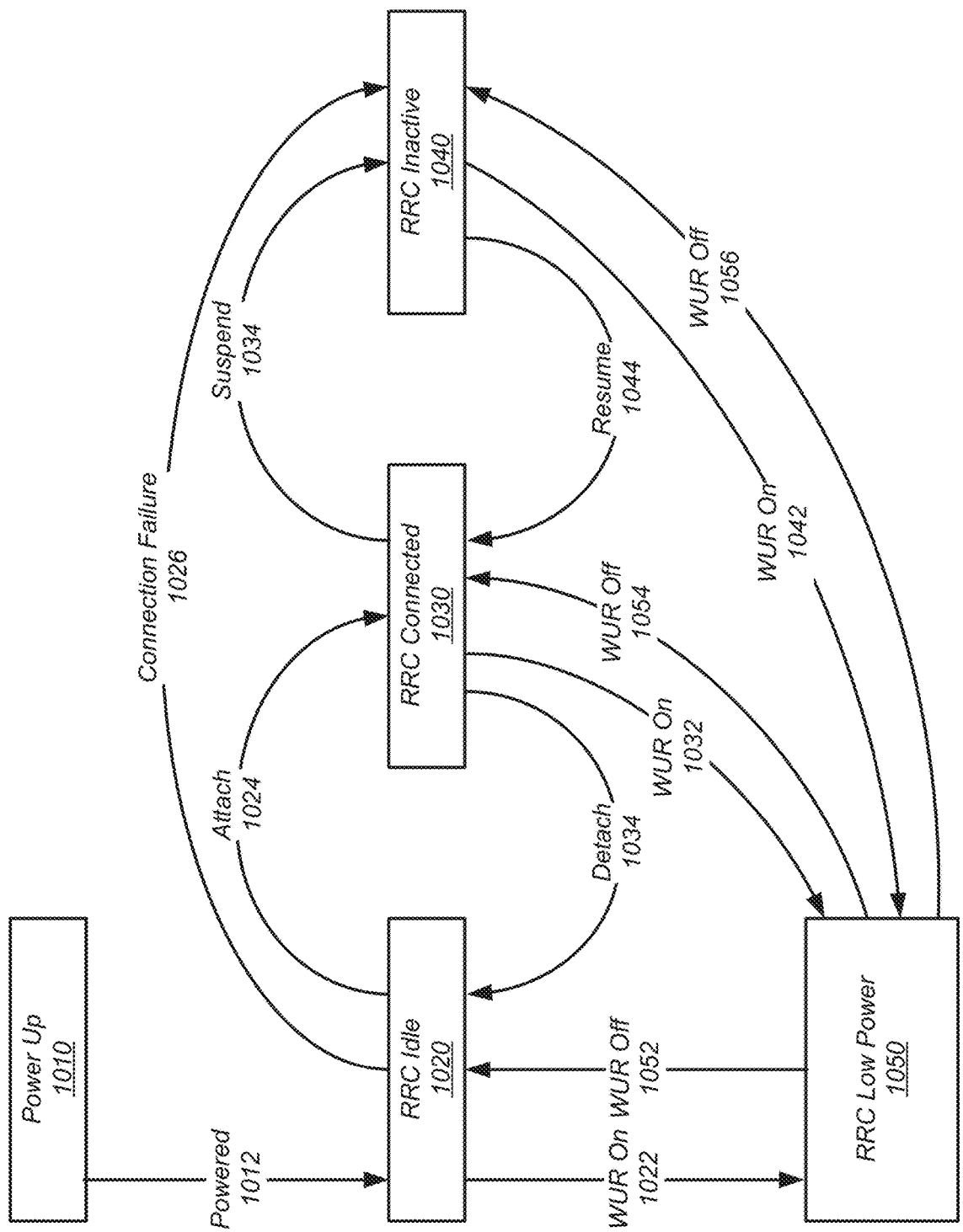

FIG. 10A illustrates an example of an RRC state machine that may be implemented by a UE, such as UE 106, according to some embodiments. As shown, the UE may move from a power up state 1010 to an RRC idle state 1020 via powered action 1012 in which at least a primary cellular radio of the UE is powered on. From RRC idle state 1020, the UE may transition to an RRC connected state 1030 via an RRC attachment procedure 1024 or to an RRC inactive state 1040 via an RRC connection failure 1026. Additionally, the UE may move from the RRC idle state 1020 to an RRC low power state 1050 via WUR on action 1022. Note that in RRC low power state 1050, the primary cellular radio may be powered off and a wakeup radio/receiver of the UE may be powered on. In some instances, WUR on action 1022 may include the receipt of any of a physical layer signal, a medium access control (MAC) control element (CE), and/or an RRC message. The physical layer signal may include at least one of (e.g., any, any combination of, and/or all of) a paging early indicator (PEI), a downlink control indicator (DCI) received via a physical downlink control channel (PDDCH), a wakeup signal received via the PDDCH, and/or a signal including one or more bit indicators. The PEI may indicate an idle state. Further, the PEI may be a PEI as specified by 3GPP Release 17. The DCI may be a DCI format 2_6, e.g., may be a UE group common DCI. Thus, the wakeup signal may be a wakeup signal as specified by 3GPP Release 16. Alternatively, and/or in addition, the DCI may be a UE specific DCI, such as DCI format X_Y (e.g., such as DCI format 0_0, DCI format 0_1, DCI format 0_2, DCI format 1_0), DCI format 1_1, DCI format 1_2, and/or any other DCI format X_Y). Note that such a DCI format (e.g., a DCI format X_Y) may be UE specific. Note further, that a UE specific DCI format may indicate a bandwidth part switch. Once in the low power RRC state 1050, the UE may transition back to the RRC idle state 1020 via WUR off action 1052. In some instances, WUR off action 1052 may include transmission of evidence of receipt of a wakeup signal to the base station.

Continuing to RRC connected state 1030, once the UE is in RRC connected state 1030, the UE can transition to the RRC idle state 1030 via RRC detachment procedure 1034 or to RRC inactive state 1040 via an RRC suspend procedure 1034. Additionally, the UE may move from the RRC connected state 1030 to the RRC low power state 1050 via WUR action 1032. In some instances, WUR on action 1032 may include the receipt of any of a physical layer signal, a medium access control (MAC) control element (CE), and/or an RRC message. The physical layer signal may include at least one of (e.g., any, any combination of, and/or all of) a downlink control indicator (DCI) received via a physical downlink control channel (PDDCH) and/or a signal including one or more bit indicators. The DCI may be a DCI format 2_6, e.g., may be a UE group common DCI. Thus, the wakeup signal may be a wakeup signal as specified by 3GPP Release 16. Alternatively, and/or in addition, the DCI may be a UE specific DCI, such as DCI format X_Y (e.g., such as DCI format 0_0, DCI format 0_1, DCI format 0_2, DCI format 1_0, DCI format 1_1, DCI format 1_2, and/or any other DCI format X_Y). Note that such a DCI format (e.g., a DCI format X_Y) may be UE specific. Note further, that a UE specific DCI format may indicate a bandwidth part switch. Once in the low power RRC state 1050, the UE may transition back to the RRC connected state 1030 via WUR off action 1054. In some instances, WUR off action 1054 may include transmission of evidence of receipt of a wakeup signal to the base station.

Continuing to RRC inactive state 1040, once the UE is in RRC inactive state 1040, the UR can transition to RRC connected state 1030 via RRC resume procedure 1044. Additionally, the UE may move from the RRC inactive state 1040 to the RRC low power state 1050 via WUR on action 1042. In some instances, WUR on action 1042 may include the receipt of any of a physical layer signal, a medium access control (MAC) control element (CE), and/or an RRC message. The physical layer signal may include at least one of (e.g., any, any combination of, and/or all of) a downlink control indicator (DCI) received via a physical downlink control channel (PDDCH) and/or a signal including one or more bit indicators. The DCI may be a DCI format 2_6, e.g., may be a UE group common DCI. Thus, the wakeup signal may be a wakeup signal as specified by 3GPP Release 16. Alternatively, and/or in addition, the DCI may be a UE specific DCI, such as DCI format X_Y (e.g., such as DCI format 0_0, DCI format 0_1, DCI format 0_2, DCI format 1_0, DCI format 1_1, DCI format 1_2, and/or any other DCI format X_Y). Note that such a DCI format (e.g., a DCI format X_Y) may be UE specific. Note further, that a UE specific DCI format may indicate a bandwidth part switch. Once in the low power RRC state 1050, the UE may transition back to the RRC inactive state 1040 via WUR off action 1056. In some instances, WUR off action 1056 may include transmission of evidence of receipt of a wakeup signal to the base station.

Note the UE may enter the RRC low power state 1050 from any of the RRC idle state 1020, RRC connected state 1030, and/or RRC inactive state 1040 and then may return to any of these states from the RRC low power state 1050. In other words, the UE may transition from any RRC state to the RRC low power state 1050 and then return to the same RRC state or to a different RRC state.

FIG. 10B illustrates another example of an RRC state machine that may be implemented by a UE, such as UE 106, according to some embodiments. As shown, the UE may move from a power up state 1010 to a PCR RRC state 1060 via powered action 1012 in which at least a primary cellular/communications radio of the UE is powered on. Note that the PCR RRC state may be any of an RRC idle state, an RRC connected state, or an RRC inactive state as well as any other RRC state in which at least the primary cellular/communications radio of the UE is powered on. From PCR RRC state 106, the UE may transition to the RRC low power state 1050 via WUR on action 1062. Note that in RRC low power state 1050, the primary cellular radio may be powered off and a wakeup radio/receiver of the UE may be powered on. In some instances, WUR on action 1062 may include the receipt of any of a physical layer signal, a medium access control (MAC) control element (CE), and/or an RRC message. The physical layer signal may include at least one of (e.g., any, any combination of, and/or all of) a paging early indicator (PEI), a downlink control indicator (DCI) received via a physical downlink control channel (PDDCH), a wakeup signal received via the PDDCH, and/or a signal including one or more bit indicators. The PEI may indicate an idle state. Further, the PEI may be a PEI as specified by 3GPP Release 17. The DCI may be a DCI format 2_6, e.g., may be a UE group common DCI. Thus, the wakeup signal may be a wakeup signal as specified by 3GPP Release 16.

Alternatively, and/or in addition, the DCI may be a UE specific DCI, such as DCI format X_Y (e.g., such as DCI format 0_0, DCI format 0_1, DCI format 0_2, DCI format 1_0, DCI format 1_1, DCI format 1_2, and/or any other DCI format X_Y). Note that such a DCI format (e.g., a DCI format X_Y) may be UE specific. Note further, that a UE specific DCI format may indicate a bandwidth part switch. Once in the low power RRC state 1050, the UE may transition back to the PCR RRC state 1060 via WUR off action 1064. In some instances, WUR off action 1064 may include transmission of evidence of receipt of a wakeup signal to the base station.

Figure 11A:
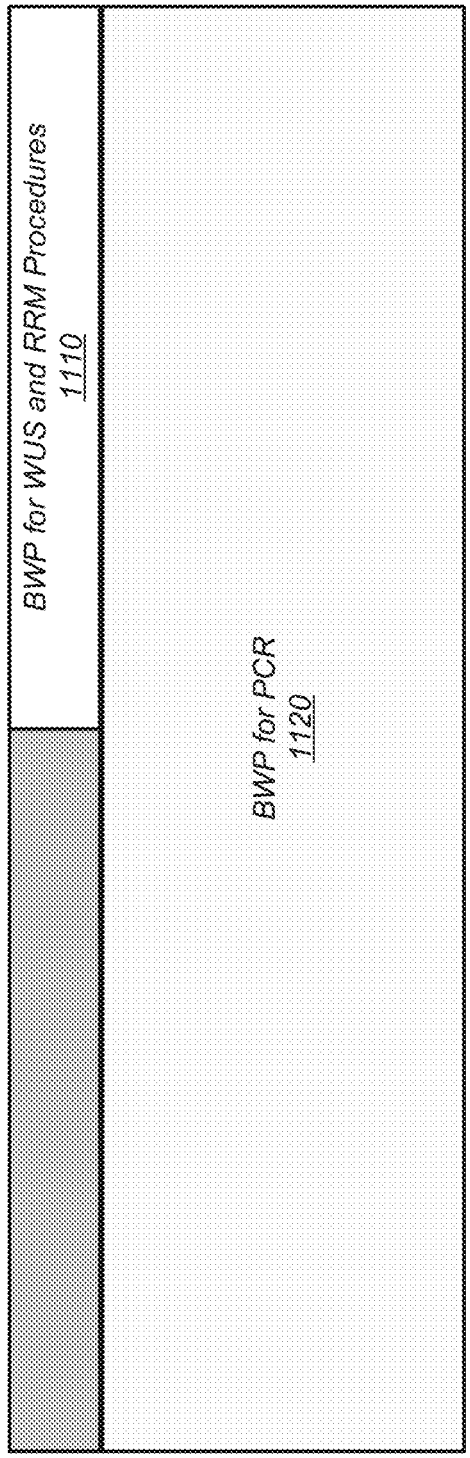
FIGS. 11A, 11B, and 11C illustrate examples of various bandwidth part configurations for a wakeup radio monitoring, according to some embodiments.
Figure 11B:
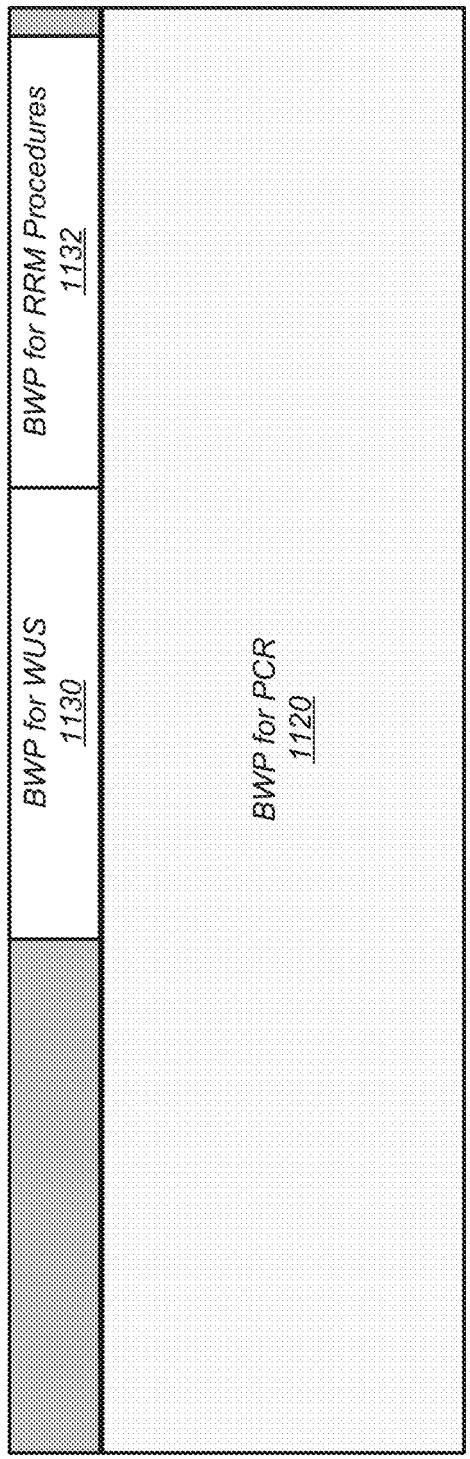
Figure 11C:
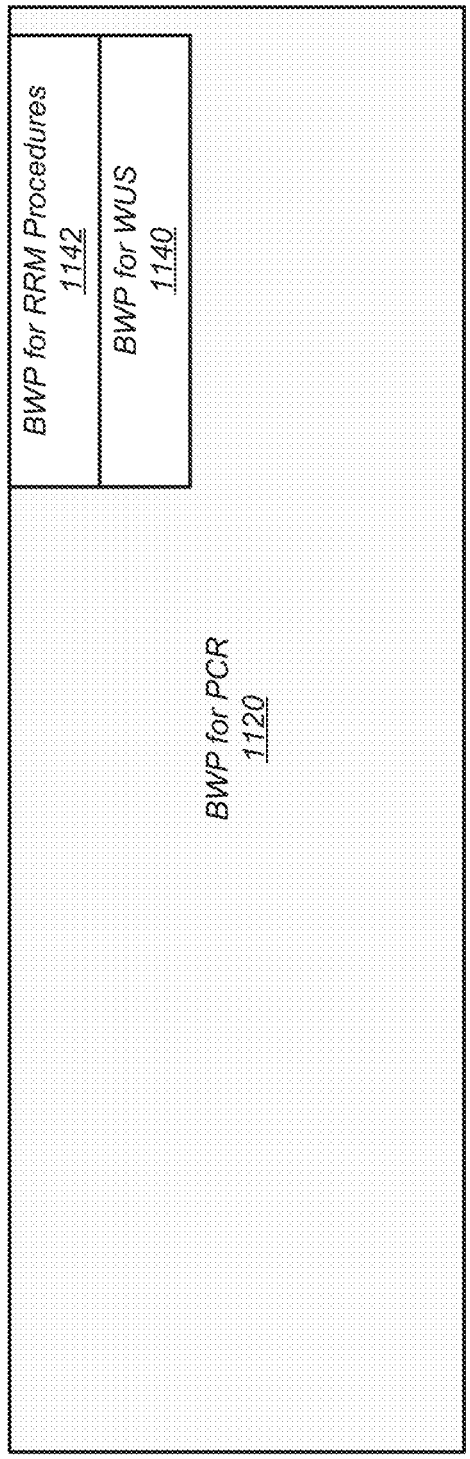

In some embodiments, a base station, such as base station 102, may configure one or more time and/or frequency resource and/or wakeup signal for a wakeup radio of a UE, such as UE 106. Note that this may be a subset of channel bandwidth configured for a primary cellular radio of the UE and not the entire channel bandwidth configured for the primary cellular radio. In some instances, the base statin may configure 4+X bandwidth parts, where four bandwidth parts are for normal transmission (e.g., for the primary cellular radio) and X bandwidth parts are defined for wakeup radio operation. For example, in some instances, the base station may configure only one bandwidth part for wakeup radio operation, e.g., as illustrated by FIG. 11A. As shown, a first bandwidth part (BWP) may be configured for primary cellular radio (PCR) communications, such as BWP for PCR 1120 and a second BWP may be configured for wakeup radio operations, such as BWP for wakeup signal (WUS) and RRM Procedures 1110. In other instances, the base station may configure more than one bandwidth part for wakeup radio operation and radio resource management procedures, such as for a discovery signal/channel (e.g., for neighbor cell discovery), e.g., as shown in FIGS. 11B and 11C. As illustrated by FIG. 11B, in some instances, a BWP for WUS, e.g., BWP for WUS 1130 and a BWP for RRM Procedures, e.g., BWP for RRM Procedures 1132, may be configured as the same bandwidth. As illustrated by FIG. 11C, in some instances, a BWP for WUS, e.g., BWP for WUS 1140 and a BWP for RRM Procedures, e.g., BWP for RRM Procedures 1142, may be configured on different bandwidths. Note that the configured bandwidth part may be a narrow band to accommodate a narrow band wakeup signal (e.g., such as On-Off key signaling). In some instances, a bandwidth part size may be fixed as a multiple of a fixed bandwidth with all wakeup signals configured at the same bandwidth. Note that the bandwidth part size may be fixed as a multiple because a multi-carrier on-off key (OOK) signal may be transmitted with same guard band between each OOK signal. In some instances, a bandwidth part size may be configurable (semi-statically and/or dynamically) to accommodate UE specific (and/or UE group) wakeup signal bandwidth and UE specific (and/or UE group) guard bands. Further bandwidth subcarrier spacing may be fixed and/or configurable, e.g., based on frequency band. For example, when the frequency band is frequency range (FR) 1 (FR1), the subcarrier spacing may be 30 kilohertz (30 kHz). As another example, when the frequency band is FR2, the subcarrier spacing may be 60 KHz. As a further example, when the frequency band is FR2-x, the subcarrier spacing may be 120 KHz. Note that these subcarrier spacing values are exemplary only and other fixed values can be used and/or considered. In other instances, a subcarrier spacing of the one or more bandwidth parts may be configurable. In some instances, bandwidth part subcarrier spacing may be configured as part of a bandwidth part configuration. However, there may not be a need to define parameters such as pdcch-ConfigCommon, pdsch-ConfigCommon, sps-Config, and/or radioLinkMonitoringConfig since wakeup signal/wakeup radio configuration parameters may already be defined, e.g., discovery channel parameters, wakeup signal data rate, and so forth. Note that in some instances, all symbols may be defined as downlink symbols. In other words, there may be no uplink and/or flexible symbols defined.

Figure 12A:
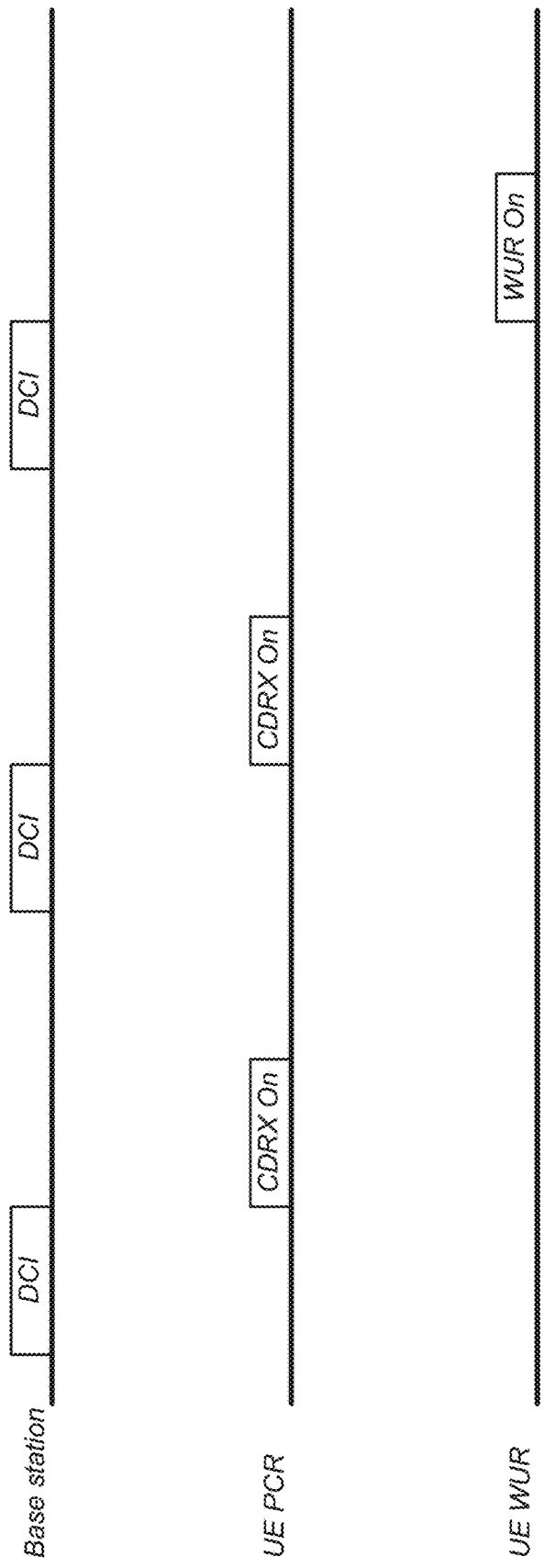
Figure 12B:
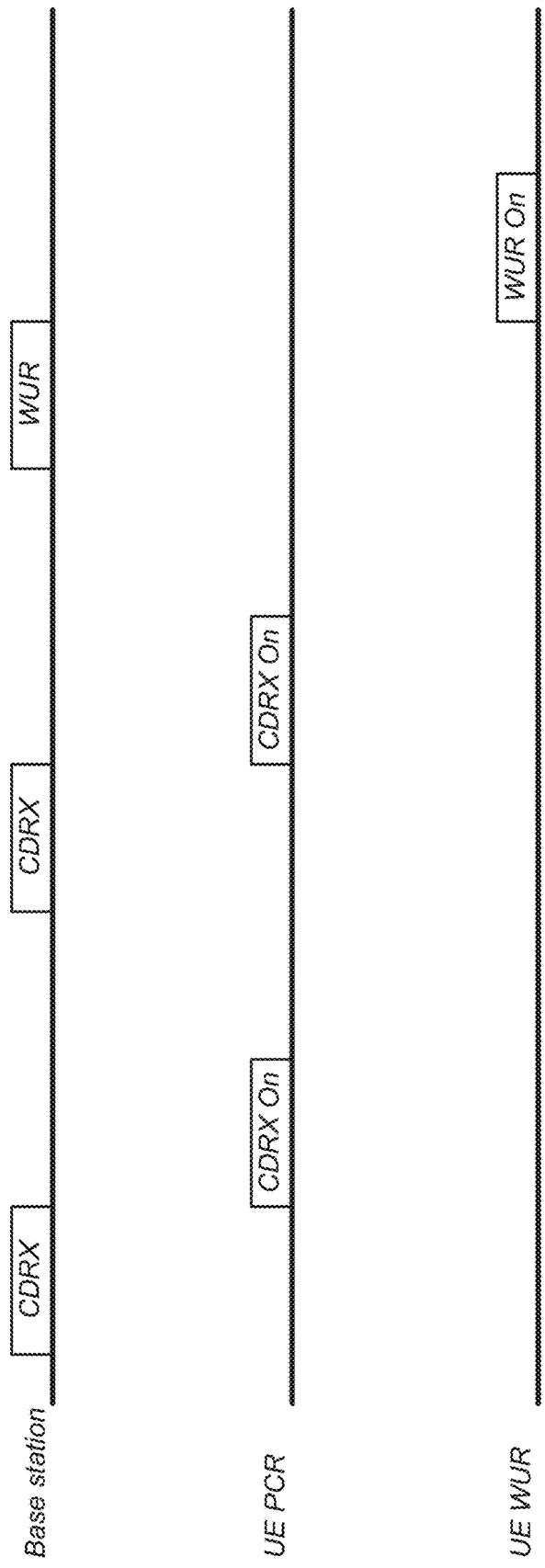

In some embodiments, a group common PDCCH such as a DCI (e.g., a modified DCI format 2_6) may be used to switch a UE, such as UE 106, from a mode (e.g., an RRC state such as RRC connected, RRC idle, and/or RRC inactive) in which a primary cellular radio of the UE is active to a mode in which the primary cellular radio is inactive and a wakeup radio of the UE is active. For example, the UE may monitor for a DCI at a configured offset (e.g., such as ps_offset) prior to a start of a CDRX ON duration until an end of a configured range of monitoring (e.g., for a configured duration of time). In some instances, e.g., as illustrated by FIG. 12A, the UE may monitor for the DCI and, when a threshold number of DCIs have been received without a wakeup indication, the UE may transition to a mode in which the primary cellular radio is inactive and a wakeup radio of the UE is active. Note that in at least some instances, the threshold number may be configurable. Note further that the threshold number may be based, at least in part, on UE capabilities and/or UE channel conditions. The UE may send a wakeup radio indication (e.g., wakeup radio to be activated) and/or an acknowledgement to a base station, such as base station 102, to inform the base station of the transition in modes. The wakeup radio indication and/or acknowledgement may be transmitted using a scheduling request and/or via a physical uplink control channel (PUCCH). In some instances, such a scheme may be used for both long and short CDRX. In some instances, e.g., as illustrated by FIG. 12B, the UE may monitor for the DCI and, when the DCI includes an indication to activate the wakeup radio, the UE may transition to a mode in which the primary cellular radio is inactive and a wakeup radio of the UE is active. Alternatively, when the DCI includes an indication to remain awake for the DCRX on cycle, the UE may remain in its current mode (e.g., with the primary cellular radio activated). The UE may send a wakeup radio indication (e.g., wakeup radio to be activated) and/or an acknowledgement to a base station, such as base station 102, to inform the base station of the transition in modes. The wakeup radio indication and/or acknowledgement may be transmitted using a scheduling request and/or via a PUCCH. Note that in either instance, transitioning to the mode in which the wakeup radio is active may trigger a bandwidth part switch to wakeup radio time and frequency resources as described herein.

Figure 13A:
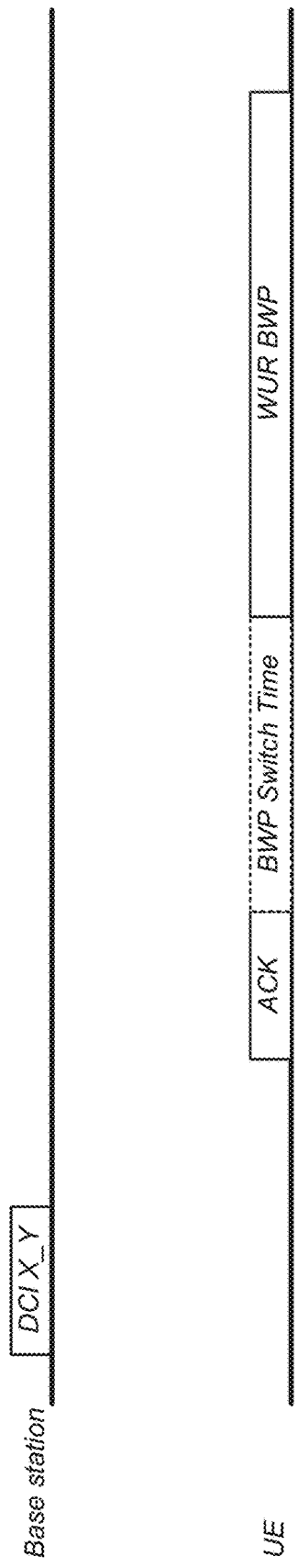
FIGS. 13A and 13B illustrate examples of various schemes for triggering a transition of a UE from an RRC state to a wakeup radio active state, according to some embodiments.
Figure 13B:
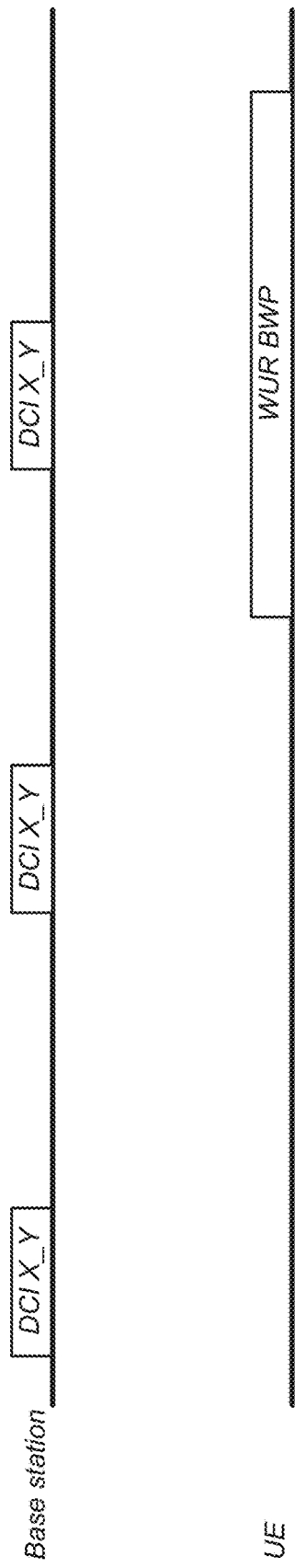

In some embodiments, UE specific signaling, such as a specific DCI format X_Y (e.g., such as any of DCI formats 0_0, 0_1, 0_2, 0_x, 1_0, 1_1, 1_2, 1_x, and so forth), may be used to switch a UE, such as UE 106, from a mode (e.g., an RRC state such as RRC connected, RRC idle, and/or RRC inactive) in which a primary cellular radio of the UE is active to a mode in which the primary cellular radio is inactive and a wakeup radio of the UE is active. For example, the UE may monitor for the specific DCI format X_Y to indicate a bandwidth part switch to a configured wakeup radio bandwidth part. Then, as illustrated by FIG. 12C, when the UE detects the specific DCI format X_Y that indicates a switch to the configured wakeup radio bandwidth part, the UE may switch from the mode in which the primary cellular radio of the UE is active to the mode in which the primary cellular radio is inactive and the wakeup radio of the UE is active. In some instances, the UE may transmit feedback to a base station, such as base station 102, prior to the bandwidth part switch. For example, as illustrated by FIG. 13A, the UE may delay (e.g., modify timing of) the bandwidth part switch until after transmitting the feedback (e.g., acknowledgement (ACK)). Such a scheme may include a DCI format that does not schedule any data and transmits ACK/NACK (acknowledgement/negative acknowledgement) and then switches bandwidth part. As another example, the UE may not send any feedback regarding the bandwidth part switch. In some instances, the base station may transmit a PDCCH carrying the DCI format X_Y with a higher-than-normal aggregation level to ensure receipt of the DCI format X_Y by the UE. In some instances, e.g., as illustrated by FIG. 13B, the base station may transmit the DCI format X_Y multiple times to ensure receipt of the DCI format X_Y by the UE.

Figure 14A:
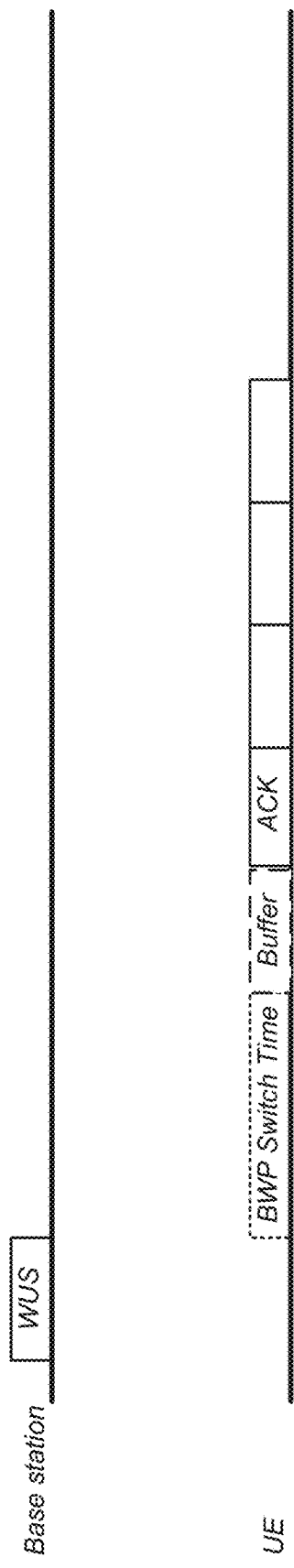
FIGS. 14A, 14B, and 14C illustrate examples of various schemes for triggering a transition of a UE from a wakeup radio active state to an RRC state, according to some embodiments.
Figure 14B:
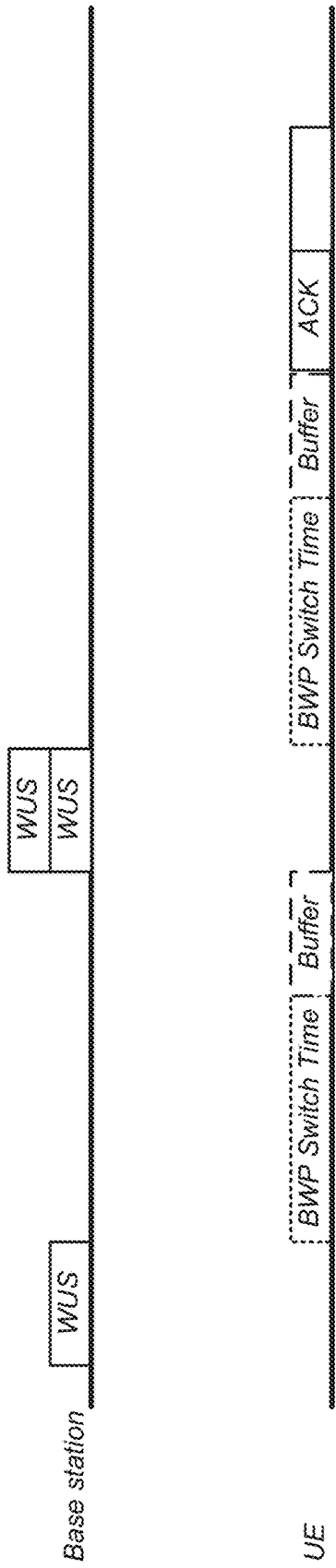
Figure 14C:
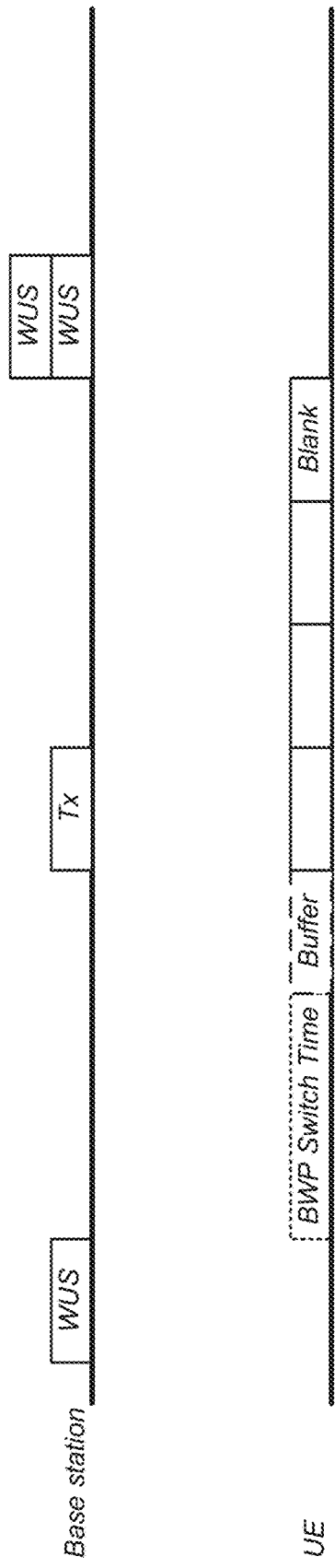

In some embodiments, a base station, such as base station 102, may transmit a wakeup signal on a configured wakeup radio bandwidth part to trigger a UE, such as UE 106, to transition from a mode in which a wakeup radio of the UE is active and a primary cellular radio of the UE is inactive to a mode (e.g., RRC state such as RRC active, RRC idle, and/or RRC inactive) in which the wakeup radio is inactive and the primary cellular radio is active. In some instances, e.g., as illustrated by FIG. 14A, such a switch may occur during the configured wakeup radio bandwidth part duration and an additional buffer time may be allocated to enable the UE to transmit an acknowledgement (ACK) to the base station. The acknowledgement may be a scheduling request and/or other PUCCH. Note that, as illustrated by FIG. 14B, if and/or when the base station does not receive an acknowledgement, the base station may retransmit the wakeup signal. In some instances, the base station may retransmit the wakeup signal with a different set of parameters (e.g., such as a lower data rate) and/or with a higher power. In some instances, the base station may retransmit the wakeup signal from multiple transmit points. In other instances, the base station may assume that the wakeup signal is always received. In such instances, the base station may start transmitting to the primary cellular radio at a specified and/or configured time after transmission of the wakeup signal. The base station may then expect an acknowledgment from the primary cellular radio. Further, if and/or when the acknowledgment is not received by the base station within a specified period of time, the base station may retransmit the wakeup signal, e.g., as illustrated by FIG. 14C. In some instances, the base station may retransmit the wakeup signal with a different set of parameters (e.g., such as a lower data rate) and/or with a higher power. In some instances, the base station may retransmit the wakeup signal from multiple transmit points.

Figure 15A:
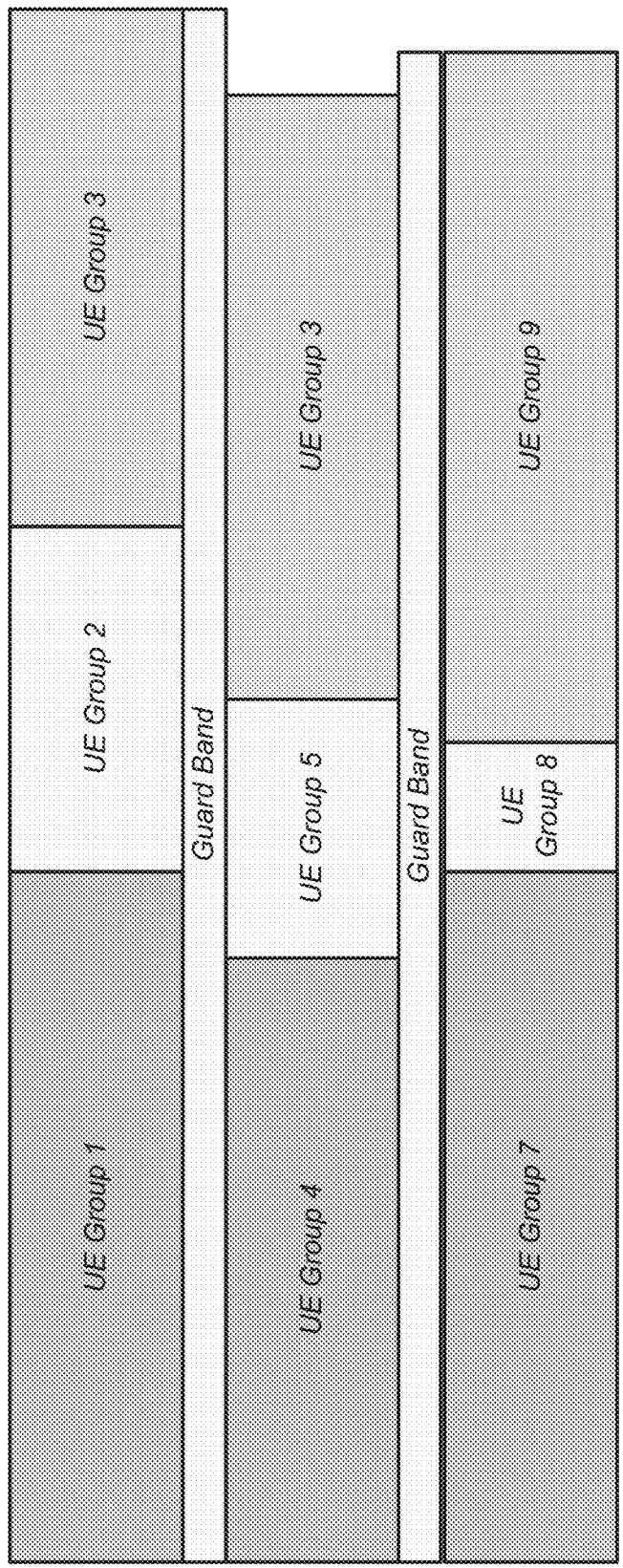
FIGS. 15A and 15B illustrate examples of various schemes for multiplexing wakeup signals, according to some embodiments.
Figure 15B:
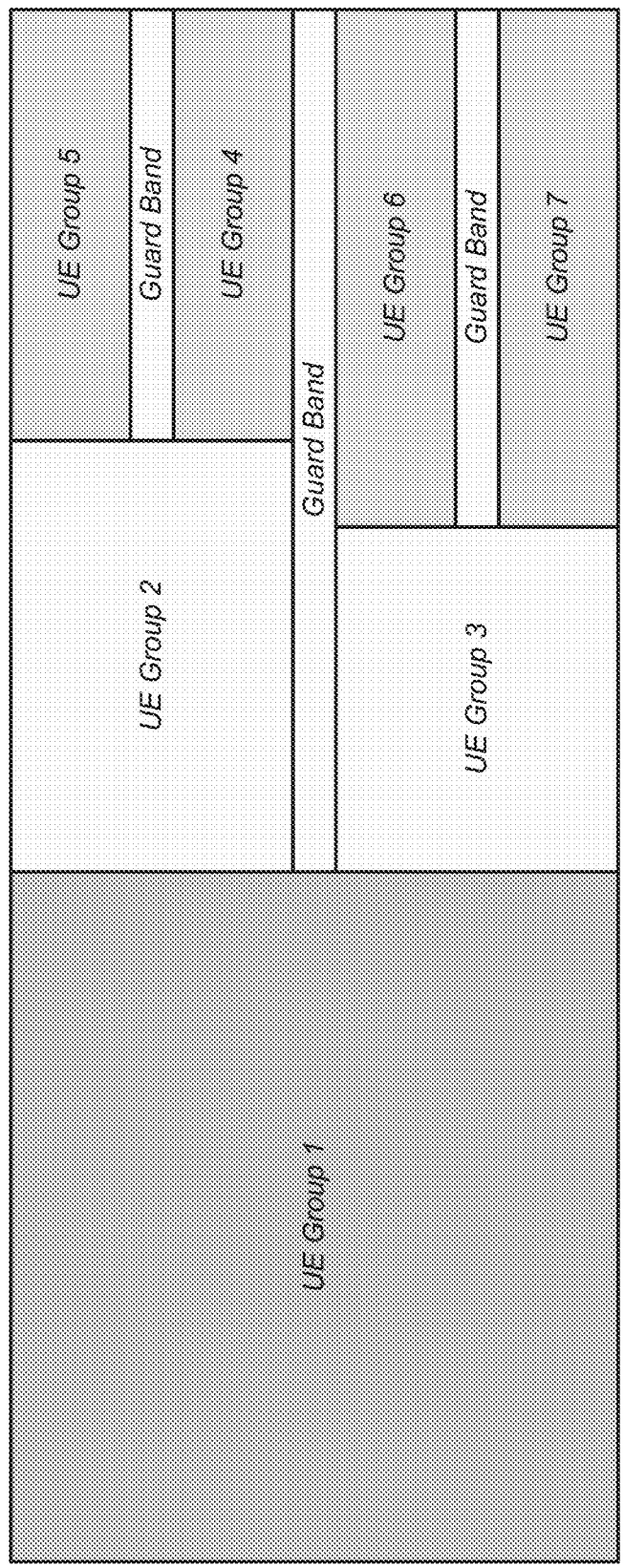

In some embodiments, multiple wakeup signals may be multiplexed in a time and frequency resource (e.g., bandwidth part). For example, as illustrated by FIG. 15A, a wakeup signal may be multiplexed as a Multi-Carrier-On-Off-Key (MC-OOK) with a fixed or configured gap between each "carrier" and time domain multiplexing of different groups within a bandwidth. Thus, as shown, UE groups 1, 2, and 3 may be time multiplexed in a first bandwidth, UE groups 4, 5, and 6 may be time multiplexed in a second bandwidth, and UE groups 7, 8, and 9 may be time multiplexed in a third bandwidth. Additionally, as shown, there may be a guard band between each group of time multiplexed group of UEs. Note that high capability UEs may be able to decode multiple multi-carrier OOK signals simultaneously and this may be used for increasing coverage (diversity) and/or data rate (capacity). Further, such a scheme may be useful if and/or when there is limited time resource to send an OOK signal. In some instances, a guard band between each WUS "carrier" may be based on configuration in which a base station, such as base station 102, allocates a UE, such as UE 106, to a wakeup signal channel based on its capability (e.g., whether the UE can decode multiple multi-carrier OOK signals simultaneously) and/or may be pre-configured/pre-specified. Note that in a licensed band, the wakeup signal may be multiplexed in both time and frequency which may allow non-even time durations of wakeup signals (e.g., no padding) as there is no need to prevent transmission of other UEs on the time and frequency resource. In some instances, such a scheme may be implemented by setting up wakeup signals with "on duty cycles" that may implicitly enable time domain multiplexing of different UE groups. As another example, as illustrated by FIG. 15B, a wakeup signal may be multiplexed as a nested group of wakeup signals. Further, to allow decoding of smaller bandwidths, a guard band between nested wakeup signals may be based on configurations in which the base station allocates the UE to a wakeup signal channel based on the UE's capability and/or may be pre-configured/pre-specified. Thus, as shown UE groups 1, 2, 3, 4, 5, 6, and 7 may be multiplexed in both time and frequency. Note that using such a bandwidth part framework may allow each UE in the group to only detect its own wakeup signal bandwidth part. Note further that in a nested group structure, time durations of different wakeup signals may have to be equal even in the licensed band.

Figure 16:
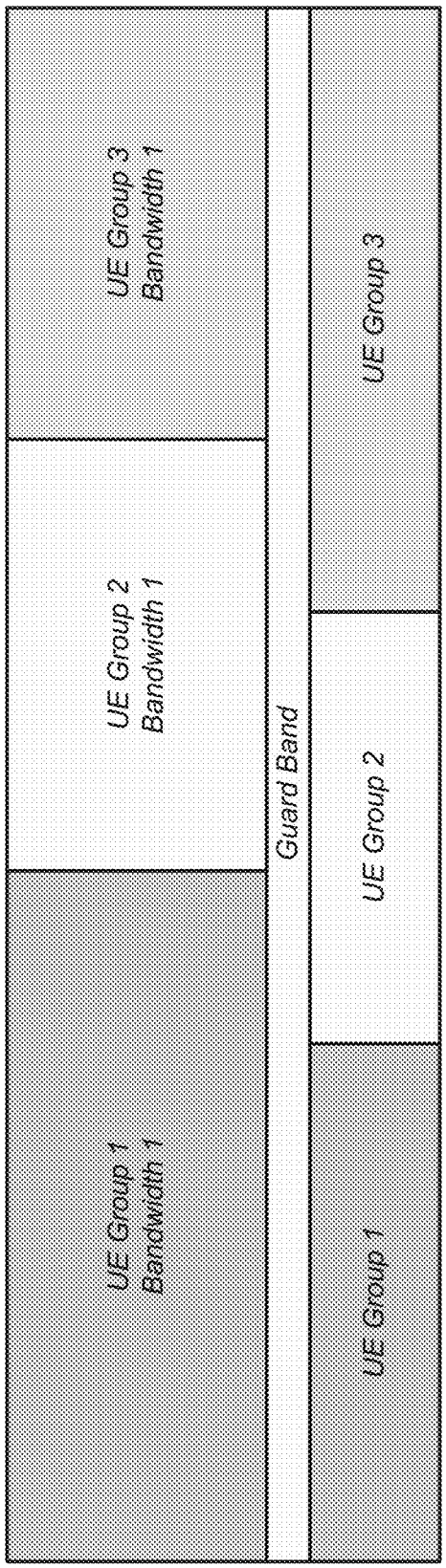
FIG. 16 illustrates an example of UE grouping for wakeup signal bandwidth monitoring, according to some embodiments.

In some embodiments, a wakeup signal bandwidth may be configured based, at least in part, on a signal to noise ratio (SNR) of a UE, such as UE 106. For example, a plurality of bandwidths may be specified and/or configured to account for differing SNRs between UEs. Note that a number of subcarriers used may be a function of a configured subcarrier spacing. Additionally, a base station, such as base station 102, may group UEs with a common bandwidth (and same and/or different subcarrier spacings) in a common time and frequency range (e.g., in a common wakeup signal) or in a common frequency at different times, e.g., as illustrated by FIG. 16. Note that different subcarrier spacing is possible with an OOK wakeup signal. Further, such a scheme may allow for a modification of a wakeup signal bandwidth based on a desired coverage. For example, coverage may be modified by selecting one or more of a bandwidth, a repetition, and/or a number of bits transmitted per OOK symbol. Note that resources for the wakeup signal may be located on a center resource/carrier frequency of a UE and/or on any frequency resource offset from a center resource/carrier frequency of the UE. Note further that the resources used for the wakeup signal may be pre-determined and/or pre-specified, e.g., such as physical resource block 0 and 1 only. Alternatively, and/or in addition, the resources used for the wakeup signal may be signaled and/or configured based on a bandwidth part configuration. For example, physical resource blocks to be used may be signaled and a size of guard bands within the physical resource blocks may also be signaled, e.g., as a number of resource elements to be avoided. The wakeup signal may also be multiplexed within the same time frequency resources e.g. using orthogonal sequences such as an orthogonal cover code or partially/non orthogonal sequences In some embodiments, e.g., for FR2 and/or FR2-x operation, transmission beams may be known by a wakeup radio. For example, the beam schedule may be passed to the wakeup radio by a primary cellular radio. As another example, the beam schedule may be signaled in a wakeup radio discovery channel for each base station. As a further example, a next beam time, e.g., a configured number of beams or an entire beam schedule, may be indicated to a UE, such as UE 106, when decoding a wakeup signal. In some instances, the UE may decode a wakeup signal at a specified and/or required time, but the wakeup signal may not include a wakeup indication. Instead, the wakeup signal includes the next beam timing.

In some embodiments, for beam-based wakeup signals, a length of the wakeup signal may be constrained (e.g., with a short wakeup signal) to enable completion of the wakeup signal in as short a time as possible. In some embodiments, for beam-based wakeup signals, a UE, such as UE 106, may expect a change in the wakeup signal receive beam at a specific time, e.g., the wakeup signal is transmitted using multiple beams over time. In some embodiments, due to a time limitation, a wakeup signal may be transmitted over a larger frequency and may have different data on each frequency, e.g., with MC-OOK.

Figure 17:
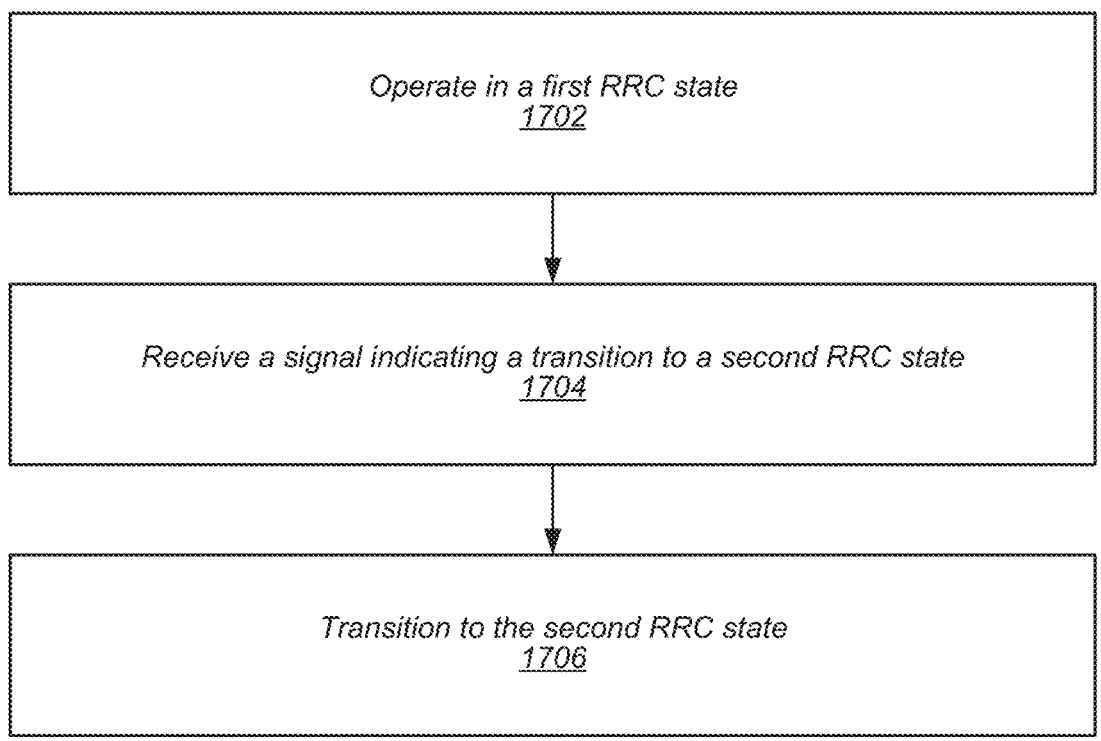
FIG. 17 illustrates a block diagram of an example of a method for operating a wakeup radio of a UE, according to some embodiments.

FIG. 17 illustrates a block diagram of an example of a method for operating a wakeup radio of a UE, according to some embodiments. The method shown in FIG. 17 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1702, a UE, such as UE 106, may operate in a first radio resource control (RRC) state. A primary communication radio (e.g., a primary cellular radio and/or a primary short-to-medium range radio) of the UE may be powered on and a wakeup radio of the UE may be powered off in the first RRC state. Note that the first RRC state may be any of an RRC idle state, an RRC inactive state, and/or an RRC connected state. Additionally, the second RRC state may be a low power RRC state such as an RRC wakeup radio (WUR) state or an RRC wakeup signal (WUS) state. Note that in at least some instances, the wakeup radio may be a wakeup receiver. In other words, the wakeup radio may only include a receiver and/or receive chain and may not include a transmitter and/or a transmit chain. Note additionally, that the wakeup receiver may be a low power and/or ultra-low power wakeup receiver.

At 1704, the UE may receive, while operating in the first RRC state, a signal indicating a transition to a second RRC state. The signal may be received from a base station, such as base station 102. The primary communication radio of the UE may be powered off and the wakeup radio of the UE may be powered on in the second RRC state. The signal may be a physical layer signal, a medium access control (MAC) control element (CE), and/or an RRC message. The physical layer signal may include at least one of (e.g., any, any combination of, and/or all of) a paging early indicator (PEI), a downlink control indicator (DCI) received via a physical downlink control channel (PDDCH), a wakeup signal received via the PDDCH, and/or a signal including one or more bit indicators. The PEI may indicate an idle state. Further, the PEI may be a PEI as specified by 3GPP Release 17. The DCI may be a DCI format 2_6, e.g., may be a UE group common DCI. Thus, the wakeup signal may be a wakeup signal as specified by 3GPP Release 16. Alternatively, and/or in addition, the DCI may be a UE specific DCI, such as DCI format X_Y (e.g., such as DCI format 0_0, DCI format 0_1, DCI format 0_2, DCI format 1_0, DCI format 1_1, DCI format 1_2, and/or any other DCI format X_Y). Note that such a DCI format (e.g., a DCI format X_Y) may be UE specific. Note further, that a UE specific DCI format may indicate a bandwidth part switch. In addition, a type of the physical layer signal may be based, at least in part, on the first RRC state.

At 1706, the UE may transition to the second RRC state based on receipt of the signal. Thus, the UE may power on the wakeup radio and power off the primary communication radio.

In some embodiments, the UE may receive, from a base station, such as base station 102, a configuration of one or more time and frequency resources for the wakeup radio to monitor. Additionally, the UE may monitor, after transitioning to the second RRC state, one or more bandwidth parts included in and/or specified by the one or more time and frequency resources. Note that the base station may configure the one or more bandwidth parts for wakeup radio monitoring and four bandwidth parts for non-wakeup radio communications. In addition, the one or more bandwidth parts for wakeup radio monitoring may include at least one bandwidth part for wakeup radio monitoring and at least one bandwidth part for radio resource management procedures, e.g., such as neighbor cell discovery. Further, the one or more bandwidth parts may be narrow band. In such instances the signal may be a wakeup signal including on-off key signaling. A bandwidth part size may be fixed as a multiple of a fixed bandwidth part and/or may be configurable to accommodate UE specific wakeup signal bandwidth and/or UE specific guard bands. Note that if and/or when the bandwidth part size is configurable, the bandwidth part size may be semi-statically or/or dynamically configurable. In some instances, a bandwidth part size may be configurable to accommodate UE group wakeup signal bandwidth and/or UE group guard bands. In such instances, the bandwidth part size may be semi-statically and/or dynamically configurable. In some instances, a subcarrier spacing of the one or more bandwidth parts may be fixed based on a frequency band. For example, when the frequency band is frequency range (FR) 1 (FR1), the subcarrier spacing may be 30 kilohertz. (30 kHz). As another example, when the frequency band is FR2, the subcarrier spacing may be 60 KHz. As a further example, when the frequency band is FR2-x, the subcarrier spacing may be 120 KHz. Note that these subcarrier spacing values are exemplary only and other fixed values can be used and/or considered. In other instances, a subcarrier spacing of the one or more bandwidth parts may be configurable. For example, a configuration of the subcarrier spacing may be included in the configuration. In some instances, the configuration of the one or more time and frequency resources for the wakeup radio to monitor may include only downlink symbols, e.g., may not include any uplink symbols and/or any special symbols.

In some embodiments, receiving, while operating in the first RRC state, the signal indicating the transition to the second RRC state may include the UE monitoring, in a group common physical downlink control channel (PDCCH), for a first downlink control indicator (DCI) format for a duration of time. The duration of time may be defined as being from a configured offset before a start of a discontinuous reception (DRX) on cycle until an end of a configured range of monitoring. In some instances, the UE may determine that a threshold number of the first DCI format have been received from a base station without a wakeup indication. In such instances, the UE may transmit, to a base station, an indication of the transition to the second RRC state, e.g., based on determining that the threshold number of the first DCI format have been received. The indication of the transition to the second RRC state may be sent via one of a scheduling request, a physical uplink control channel (PUCCH), and/or via another signal and/or signaling type. In some instances, the UE may receive the first DCI format and determine that the first DCI format includes an indication to transition to the second RRC state. Then, based on the determination, the UE may transmit, to a base station, an indication of the transition to the second RRC state, e.g., as an acknowledgment of receipt of the first DCI format. In some instances, the indication of the transition to the second RRC state may be sent via one of a scheduling request, a physical uplink control channel (PUCCH), and/or via another signal and/or signaling type. In some instances, transitioning to the second RRC state based on receipt of the signal may include the UE performing a bandwidth part switch to time and frequency resources configured for wakeup radio monitoring.

In some embodiments, the UE receiving, while operating in the first RRC state, the signal indicating the transition to the second RRC state may include the UE monitoring, in a group common physical downlink control channel (PDCCH), for a UE specific downlink control indicator (DCI) format for bandwidth part switching. In such instances, the UE transitioning to the second RRC state based on receipt of the signal may include the UE switching to a preconfigured bandwidth part for wakeup radio monitoring based on receipt of the UE specific DCI format. Note that the UE specific DCI format may include at least one of DCI format 0_0, DCI format 0_1, DCI format 0_2, DCI format 0_x, DCI format 1_0, DCI format 1_1, DCI format 1_2, or DCI format 1_x. In some instances, the UE may transmit, to a base station, an indication of the transition to the second RRC state. Note that such a transmission may occur prior to transitioning to the second RRC state. In some instances, the PDCCH may be received with a higher-than-normal aggregation level to ensure receipt of the UE specific DCI format. In some instances, the UE specific DCI format may be transmitted multiple times by a base station to ensure receipt of the UE specific DCI format.

In some embodiments, the UE may monitor, while operating in the second RRC state, a configured bandwidth part. Then, upon receipt of a wakeup signal, the UE may transition to a third RRC state. Note that in the third RRC state, the primary communication radio of the UE may be powered on and the wakeup radio of the UE may be powered off. Note further that the third RRC state may any one of an RRC idle state, an RRC inactive state, and/or an RRC connected state. In at least some instances, the third RRC state may be equivalent to the first RRC state. However, in at least some other instances, the third RRC state may be different than the first RRC state. The transition to the third RRC state may occur prior to a bandwidth part switch from the configured bandwidth part. In such instances, the UE may transmit, to a base station, an indication of the transition to the third RRC state. The indication of the transition to the third RRC state may be sent via one of a scheduling request, a physical uplink control channel (PUCCH), and/or via another signal and/or signaling type. In some instances, the UE may be required, by a base station, to transition to the third RRC state within a specified amount of time after transmission of the wakeup signal. In some instances, the UE may, after transitioning to the third RRC state, transmit, to a base station, an acknowledgment. Note that when the UE does not transition to the third RRC state within the specified amount of time (e.g., when the base station does not receive an acknowledgement with the specified amount of time), the base station may retransmit the wakeup signal. The base station may retransmit the wakeup signal with one or more of a lower data rate or a higher power as compared to a prior wakeup signal. Further, the base station may retransmit the wakeup signal from another transmit receive point.

In some embodiments, the signal may be multiplexed with one or more other signals in a time and frequency resource. For example, the signal may be multiplexed as a multi-carrier-on-off-key (MC-OOC) with a gap between carriers and time domain multiplexing of different groups within a bandwidth. Note that the gap may be a fixed gap and/or a configured gap. Note further that a guard band between each carrier may be based on a configuration in which a base station allocates the UE to a particular frequency resource based on the UE's capability. Alternatively, and/or in addition, a guard band between each carrier may be pre-configured and/or pre-specified. As another example, the signal may be multiplexed as a nested group of signals. Note that, in such instances, a guard band between nested groups of signals may be based on a configuration in which a base station allocates the UE to a particular frequency resource based on the UE's capability. Alternatively, and/or in addition, a guard band between nested groups of signals may be pre-configured and/or pre-specified.

In some embodiments, a bandwidth of the signal may be configured based on a signal to noise ratio (SNR) reported by the UE to a base station. For example, the bandwidth of the signal may be selected from a plurality of bandwidths based on the SNR. Further, a number of subcarriers used for the signal may be a function of a configured subcarrier spacing. Additionally, the UE may be grouped with other UEs in the bandwidth in a common time and frequency range.

In some embodiments, a beam schedule for a wakeup signal may be indicated to the wakeup radio. The indication of the beam schedule for the wakeup signal may be received from the primary communication radio. Alternatively, and/or in addition, the indication of the beam schedule for the wakeup signal may be signaled in a wakeup radio discovery channel. As a further option, the indication of the beam schedule for the wakeup signal may be signaled as part of a wakeup signal. In some instances, a length of the wakeup signal may be limited, e.g., to further conserve UE power and/or to further reduce UE power requirements. In some instances, the beam schedule may include a change in a receive beam at a specific time. In some instances, the beam schedule may include the wakeup signal being transmitted with different data on each of multiple frequencies.

Figure 18:
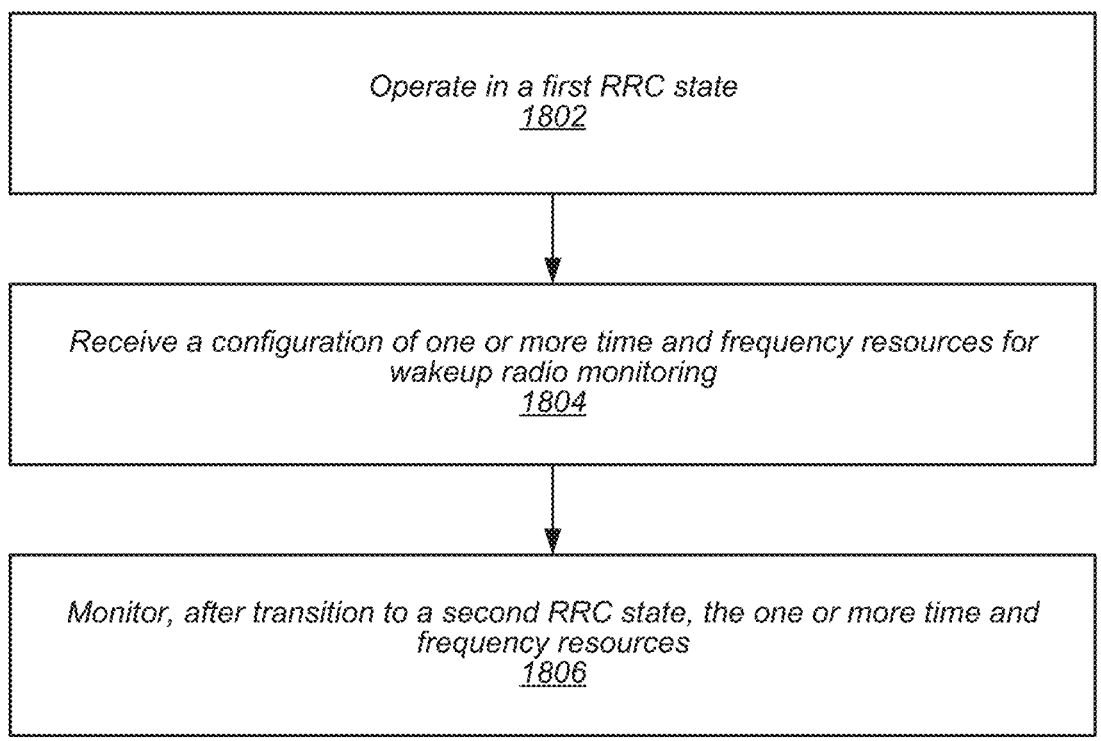
FIG. 18 illustrates a block diagram of another example of a method for operating a wakeup radio of a UE, according to some embodiments.

FIG. 18 illustrates a block diagram of another example of a method for operating a wakeup radio of a UE, according to some embodiments. The method shown in FIG. 18 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1802, a UE, such as UE 106, may operate in a first radio resource control (RRC) state. A primary communication radio (e.g., a primary cellular radio and/or a primary short-to-medium range radio) of the UE may be powered on and a wakeup radio of the UE may be powered off in the first RRC state. Note that the first RRC state may be any of an RRC idle state, an RRC inactive state, and/or an RRC connected state. Additionally, the second RRC state may be a low power RRC state such as an RRC wakeup radio (WUR) state or an RRC wakeup signal (WUS) state. Note that in at least some instances, the wakeup radio may be a wakeup receiver. In other words, the wakeup radio may only include a receiver and/or receive chain and may not include a transmitter and/or a transmit chain. Note additionally, that the wakeup receiver may be a low power and/or ultra-low power wakeup receiver.

At 1804, the UE may receive, from a base station, such as base station 102, a configuration of one or more time and frequency resources for the wakeup radio to monitor.

At 1806, the UE may monitor, after transitioning to a second RRC state, one or more bandwidth parts included in and/or specified by the one or more time and frequency resources. Note that the base station may configure the one or more bandwidth parts for wakeup radio monitoring and four bandwidth parts for non-wakeup radio communications. In addition, the one or more bandwidth parts for wakeup radio monitoring may include at least one bandwidth part for wakeup radio monitoring and at least one bandwidth part for radio resource management procedures, e.g., such as neighbor cell discovery. Further, the one or more bandwidth parts may be narrow band. In such instances the signal may be a wakeup signal including on-off key signaling. A bandwidth part size may be fixed as a multiple of a fixed bandwidth part and/or may be configurable to accommodate UE specific wakeup signal bandwidth and/or UE specific guard bands. Note that if and/or when the bandwidth part size is configurable, the bandwidth part size may be semi-statically or/or dynamically configurable. In some instances, a bandwidth part size may be configurable to accommodate UE group wakeup signal bandwidth and/or UE group guard bands. In such instances, the bandwidth part size may be semi-statically and/or dynamically configurable. In some instances, a subcarrier spacing of the one or more bandwidth parts may be fixed based on a frequency band. For example, when the frequency band is frequency range (FR) 1 (FR1), the subcarrier spacing may be 30 kilohertz. (30 kHz). As another example, when the frequency band is FR2, the subcarrier spacing may be 60 KHz. As a further example, when the frequency band is FR2-x, the subcarrier spacing may be 120 kHz. Note that these subcarrier spacing values are exemplary only and other fixed values can be used and/or considered. In other instances, a subcarrier spacing of the one or more bandwidth parts may be configurable. For example, a configuration of the subcarrier spacing may be included in the configuration. In some instances, the configuration of the one or more time and frequency resources for the wakeup radio to monitor may include only downlink symbols, e.g., may not include any uplink symbols and/or any special symbols.

In some embodiments, the UE may receive, while operating in the first RRC state, a signal indicating the transition to a second RRC state. The signal may be received from the base station, e.g., base station 102. The primary communication radio of the UE may be powered off and the wakeup radio of the UE may be powered on in the second RRC state. The signal may be a physical layer signal, a medium access control (MAC) control element (CE), and/or an RRC message. The physical layer signal may include at least one of (e.g., any, any combination of, and/or all of) a paging early indicator (PEI), a downlink control indicator (DCI) received via a physical downlink control channel (PDDCH), a wakeup signal received via the PDDCH, and/or a signal including one or more bit indicators. The PEI may indicate an idle state. Further, the PEI may be a PEI as specified by 3GPP Release 17. The DCI may be a DCI format 2_6, e.g., may be a UE group common DCI. Thus, the wakeup signal may be a wakeup signal as specified by 3GPP Release 16. Alternatively, and/or in addition, the DCI may be a UE specific DCI, such as DCI format X_Y (e.g., such as DCI format 0_0, DCI format 0_1, DCI format 0_2, DCI format 1_0, DCI format 1_1, DCI format 1_2, and/or any other DCI format X_Y). Note that such a DCI format (e.g., a DCI format X_Y) may be UE specific. Note further, that a UE specific DCI format may indicate a bandwidth part switch. In addition, a type of the physical layer signal may be based, at least in part, on the first RRC state. Further, the UE may transition to the second RRC state based on receipt of the signal. Thus, the UE may power on the wakeup radio and power off the primary communication radio.

In some embodiments, receiving, while operating in the first RRC state, the signal indicating the transition to the second RRC state may include the UE monitoring, in a group common physical downlink control channel (PDCCH), for a first downlink control indicator (DCI) format for a duration of time. The duration of time may be defined as being from a configured offset before a start of a discontinuous reception (DRX) on cycle until an end of a configured range of monitoring. In some instances, the UE may determine that a threshold number of the first DCI format have been received from a base station without a wakeup indication. In such instances, the UE may transmit, to a base station, an indication of the transition to the second RRC state, e.g., based on determining that the threshold number of the first DCI format have been received. The indication of the transition to the second RRC state may be sent via one of a scheduling request, a physical uplink control channel (PUCCH), and/or via another signal and/or signaling type. In some instances, the UE may receive the first DCI format and determine that the first DCI format includes an indication to transition to the second RRC state. Then, based on the determination, the UE may transmit, to a base station, an indication of the transition to the second RRC state, e.g., as an acknowledgment of receipt of the first DCI format. In some instances, the indication of the transition to the second RRC state may be sent via one of a scheduling request, a physical uplink control channel (PUCCH), and/or via another signal and/or signaling type. In some instances, transitioning to the second RRC state based on receipt of the signal may include the UE performing a bandwidth part switch to time and frequency resources configured for wakeup radio monitoring.

In some embodiments, the UE receiving, while operating in the first RRC state, the signal indicating the transition to the second RRC state may include the UE monitoring, in a group common physical downlink control channel (PDCCH), for a UE specific downlink control indicator (DCI) format for bandwidth part switching. In such instances, the UE transitioning to the second RRC state based on receipt of the signal may include the UE switching to a preconfigured bandwidth part for wakeup radio monitoring based on receipt of the UE specific DCI format. Note that the UE specific DCI format may include at least one of DCI format 0_0, DCI format 0_1, DCI format 0_2, DCI format 0_x, DCI format 1_0, DCI format 1_1, DCI format 1_2, or DCI format 1_x. In some instances, the UE may transmit, to a base station, an indication of the transition to the second RRC state. Note that such a transmission may occur prior to transitioning to the second RRC state. In some instances, the PDCCH may be received with a higher-than-normal aggregation level to ensure receipt of the UE specific DCI format. In some instances, the UE specific DCI format may be transmitted multiple times by a base station to ensure receipt of the UE specific DCI format.

In some embodiments, the UE may monitor, while operating in the second RRC state, a configured bandwidth part. Then, upon receipt of a wakeup signal, the UE may transition to a third RRC state. Note that in the third RRC state, the primary communication radio of the UE may be powered on and the wakeup radio of the UE may be powered off. Note further that the third RRC state may any one of an RRC idle state, an RRC inactive state, and/or an RRC connected state. In at least some instances, the third RRC state may be equivalent to the first RRC state. However, in at least some other instances, the third RRC state may be different than the first RRC state. The transition to the third RRC state may occur prior to a bandwidth part switch from the configured bandwidth part. In such instances, the UE may transmit, to a base station, an indication of the transition to the third RRC state. The indication of the transition to the third RRC state may be sent via one of a scheduling request, a physical uplink control channel (PUCCH), and/or via another signal and/or signaling type. In some instances, the UE may be required, by a base station, to transition to the third RRC state within a specified amount of time after transmission of the wakeup signal. In some instances, the UE may, after transitioning to the third RRC state, transmit, to a base station, an acknowledgment. Note that when the UE does not transition to the third RRC state within the specified amount of time (e.g., when the base station does not receive an acknowledgement with the specified amount of time), the base station may retransmit the wakeup signal. The base station may retransmit the wakeup signal with one or more of a lower data rate or a higher power as compared to a prior wakeup signal. Further, the base station may retransmit the wakeup signal from another transmit receive point.

In some embodiments, the signal may be multiplexed with one or more other signals in a time and frequency resource. For example, the signal may be multiplexed as a multi-carrier-on-off-key (MC-OOC) with a gap between carriers and time domain multiplexing of different groups within a bandwidth. Note that the gap may be a fixed gap and/or a configured gap. Note further that a guard band between each carrier may be based on a configuration in which a base station allocates the UE to a particular frequency resource based on the UE's capability. Alternatively, and/or in addition, a guard band between each carrier may be pre-configured and/or pre-specified. As another example, the signal may be multiplexed as a nested group of signals. Note that, in such instances, a guard band between nested groups of signals may be based on a configuration in which a base station allocates the UE to a particular frequency resource based on the UE's capability. Alternatively, and/or in addition, a guard band between nested groups of signals may be pre-configured and/or pre-specified.

In some embodiments, a bandwidth of the signal may be configured based on a signal to noise ratio (SNR) reported by the UE to a base station. For example, the bandwidth of the signal may be selected from a plurality of bandwidths based on the SNR. Further, a number of subcarriers used for the signal may be a function of a configured subcarrier spacing. Additionally, the UE may be grouped with other UEs in the bandwidth in a common time and frequency range.

In some embodiments, a beam schedule for a wakeup signal may be indicated to the wakeup radio. The indication of the beam schedule for the wakeup signal may be received from the primary communication radio. Alternatively, and/or in addition, the indication of the beam schedule for the wakeup signal may be signaled in a wakeup radio discovery channel. As a further option, the indication of the beam schedule for the wakeup signal may be signaled as part of a wakeup signal. In some instances, a length of the wakeup signal may be limited, e.g., to further conserve UE power and/or to further reduce UE power requirements. In some instances, the beam schedule may include a change in a receive beam at a specific time. In some instances, the beam schedule may include the wakeup signal being transmitted with different data on each of multiple frequencies.

Figure 19:
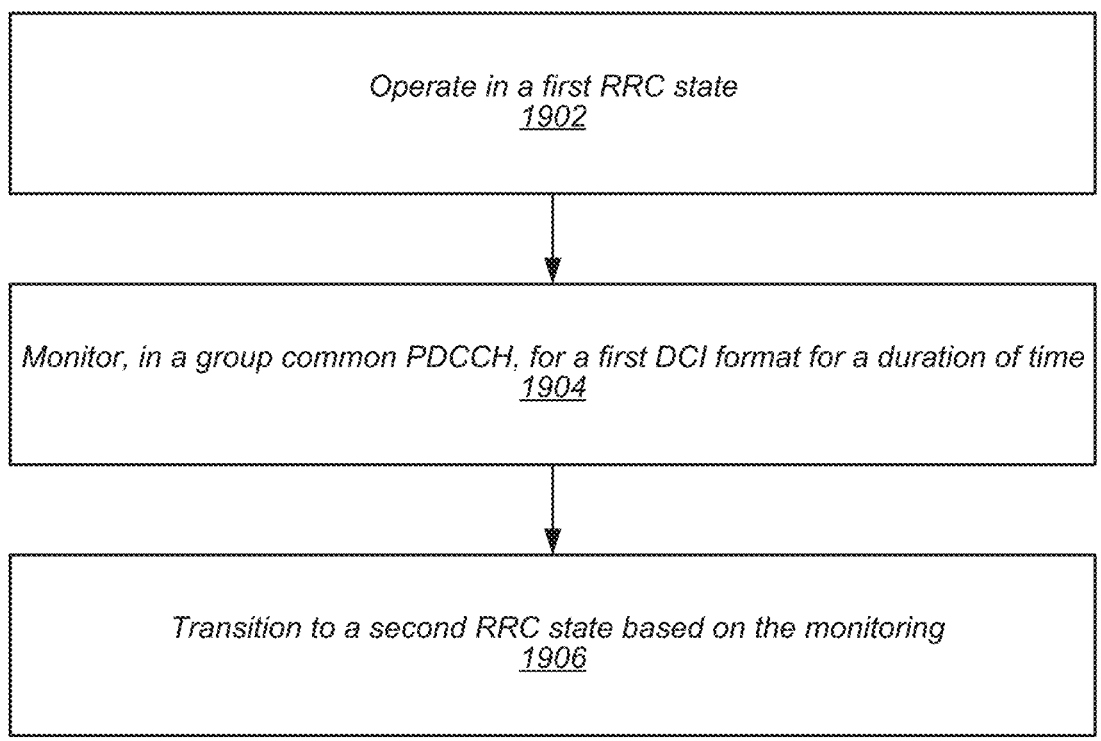
FIG. 19 illustrates a block diagram of an example of a method for monitoring for a DCI format as part of operating a wakeup radio of a UE, according to some embodiments.

FIG. 19 illustrates a block diagram of an example of a method for monitoring for a DCI format as part of operating a wakeup radio of a UE, according to some embodiments. The method shown in FIG. 19 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1902, a UE, such as UE 106, may operate in a first radio resource control (RRC) state. A primary communication radio (e.g., a primary cellular radio and/or a primary short-to-medium range radio) of the UE may be powered on and a wakeup radio of the UE may be powered off in the first RRC state. Note that the first RRC state may be any of an RRC idle state, an RRC inactive state, and/or an RRC connected state. Additionally, the second RRC state may be a low power RRC state such as an RRC wakeup radio (WUR) state or an RRC wakeup signal (WUS) state. Note that in at least some instances, the wakeup radio may be a wakeup receiver. In other words, the wakeup radio may only include a receiver and/or receive chain and may not include a transmitter and/or a transmit chain. Note additionally, that the wakeup receiver may be a low power and/or ultra-low power wakeup receiver.

At 1904, the UE may monitor, in a group common physical downlink control channel (PDCCH), for a first downlink control indicator (DCI) format for a duration of time. The duration of time may be defined as being from a configured offset before a start of a discontinuous reception (DRX) on cycle until an end of a configured range of monitoring. In some instances, the UE may determine that a threshold number of the first DCI format have been received from a base station without a wakeup indication. In such instances, the UE may transmit, to a base station, an indication of a transition to the second RRC state, e.g., based on determining that the threshold number of the first DCI format have been received. The indication of the transition to the second RRC state may be sent via one of a scheduling request, a physical uplink control channel (PUCCH), and/or via another signal and/or signaling type. In some instances, the UE may receive the first DCI format and determine that the first DCI format includes an indication to transition to the second RRC state. Then, based on the determination, the UE may transmit, to a base station, an indication of the transition to the second RRC state, e.g., as an acknowledgment of receipt of the first DCI format. In some instances, the indication of the transition to the second RRC state may be sent via one of a scheduling request, a physical uplink control channel (PUCCH), and/or via another signal and/or signaling type. In some instances, transitioning to the second RRC state based on receipt of the signal may include the UE performing a bandwidth part switch to time and frequency resources configured for wakeup radio monitoring.

At 1906, the UE may transition to the second RRC state, e.g., based on the monitoring. In other words, upon detection and decoding of the first DCI format, the UE may transition to the second RRC state. Thus, the UE may power on the wakeup radio and power off the primary communication radio.

In some embodiments, monitoring for the first DCI format may include the UE receiving, while operating in the first RRC state, a signal indicating a transition to a second RRC state. The signal may be received from a base station, such as base station 102. The primary communication radio of the UE may be powered off and the wakeup radio of the UE may be powered on in the second RRC state. The signal may be a physical layer signal, a medium access control (MAC) control element (CE), and/or an RRC message. The physical layer signal may include at least one of (e.g., any, any combination of, and/or all of) a paging early indicator (PEI), a downlink control indicator (DCI) received via a physical downlink control channel (PDDCH), a wakeup signal received via the PDDCH, and/or a signal including one or more bit indicators. The PEI may indicate an idle state. Further, the PEI may be a PEI as specified by 3GPP Release 17. The DCI may be a DCI format 2_6, e.g., may be a UE group common DCI. Thus, the wakeup signal may be a wakeup signal as specified by 3GPP Release 16. Alternatively, and/or in addition, the DCI may be a UE specific DCI, such as DCI format X_Y (e.g., such as DCI format 0_0, DCI format 0_1, DCI format 0_2, DCI format 1_0, DCI format 1_1, DCI format 1_2, and/or any other DCI format X_Y). Note that such a DCI format (e.g., a DCI format X_Y) may be UE specific. Note further, that a UE specific DCI format may indicate a bandwidth part switch. In addition, a type of the physical layer signal may be based, at least in part, on the first RRC state.

In some embodiments, the UE may receive, from a base station, such as base station 102, a configuration of one or more time and frequency resources for the wakeup radio to monitor. Additionally, the UE may monitor, after transitioning to the second RRC state, one or more bandwidth parts included in and/or specified by the one or more time and frequency resources. Note that the base station may configure the one or more bandwidth parts for wakeup radio monitoring and four bandwidth parts for non-wakeup radio communications. In addition, the one or more bandwidth parts for wakeup radio monitoring may include at least one bandwidth part for wakeup radio monitoring and at least one bandwidth part for radio resource management procedures, e.g., such as neighbor cell discovery. Further, the one or more bandwidth parts may be narrow band. In such instances the signal may be a wakeup signal including on-off key signaling. A bandwidth part size may be fixed as a multiple of a fixed bandwidth part and/or may be configurable to accommodate UE specific wakeup signal bandwidth and/or UE specific guard bands. Note that if and/or when the bandwidth part size is configurable, the bandwidth part size may be semi-statically or/or dynamically configurable. In some instances, a bandwidth part size may be configurable to accommodate UE group wakeup signal bandwidth and/or UE group guard bands. In such instances, the bandwidth part size may be semi-statically and/or dynamically configurable. In some instances, a subcarrier spacing of the one or more bandwidth parts may be fixed based on a frequency band. For example, when the frequency band is frequency range (FR) 1 (FR1), the subcarrier spacing may be 30 kilohertz (30 kHz). As another example, when the frequency band is FR2, the subcarrier spacing may be 60 KHz. As a further example, when the frequency band is FR2-x, the subcarrier spacing may be 120 KHz. Note that these subcarrier spacing values are exemplary only and other fixed values can be used and/or considered. In other instances, a subcarrier spacing of the one or more bandwidth parts may be configurable. For example, a configuration of the subcarrier spacing may be included in the configuration. In some instances, the configuration of the one or more time and frequency resources for the wakeup radio to monitor may include only downlink symbols, e.g., may not include any uplink symbols and/or any special symbols.

In some embodiments, the UE receiving, while operating in the first RRC state, the signal indicating the transition to the second RRC state may include the UE monitoring, in a group common physical downlink control channel (PDCCH), for a UE specific downlink control indicator (DCI) format for bandwidth part switching. In such instances, the UE transitioning to the second RRC state based on receipt of the signal may include the UE switching to a preconfigured bandwidth part for wakeup radio monitoring based on receipt of the UE specific DCI format. Note that the UE specific DCI format may include at least one of DCI format 0_0, DCI format 0_1, DCI format 0_2, DCI format 0_x, DCI format 1_0, DCI format 1_1, DCI format 1_2, or DCI format 1_x. In some instances, the UE may transmit, to a base station, an indication of the transition to the second RRC state. Note that such a transmission may occur prior to transitioning to the second RRC state. In some instances, the PDCCH may be received with a higher-than-normal aggregation level to ensure receipt of the UE specific DCI format. In some instances, the UE specific DCI format may be transmitted multiple times by a base station to ensure receipt of the UE specific DCI format.

In some embodiments, the UE may monitor, while operating in the second RRC state, a configured bandwidth part. Then, upon receipt of a wakeup signal, the UE may transition to a third RRC state. Note that in the third RRC state, the primary communication radio of the UE may be powered on and the wakeup radio of the UE may be powered off. Note further that the third RRC state may any one of an RRC idle state, an RRC inactive state, and/or an RRC connected state. In at least some instances, the third RRC state may be equivalent to the first RRC state. However, in at least some other instances, the third RRC state may be different than the first RRC state. The transition to the third RRC state may occur prior to a bandwidth part switch from the configured bandwidth part. In such instances, the UE may transmit, to a base station, an indication of the transition to the third RRC state. The indication of the transition to the third RRC state may be sent via one of a scheduling request, a physical uplink control channel (PUCCH), and/or via another signal and/or signaling type. In some instances, the UE may be required, by a base station, to transition to the third RRC state within a specified amount of time after transmission of the wakeup signal. In some instances, the UE may, after transitioning to the third RRC state, transmit, to a base station, an acknowledgment. Note that when the UE does not transition to the third RRC state within the specified amount of time (e.g., when the base station does not receive an acknowledgement with the specified amount of time), the base station may retransmit the wakeup signal. The base station may retransmit the wakeup signal with one or more of a lower data rate or a higher power as compared to a prior wakeup signal. Further, the base station may retransmit the wakeup signal from another transmit receive point.

In some embodiments, the signal may be multiplexed with one or more other signals in a time and frequency resource. For example, the signal may be multiplexed as a multi-carrier-on-off-key (MC-OOC) with a gap between carriers and time domain multiplexing of different groups within a bandwidth. Note that the gap may be a fixed gap and/or a configured gap. Note further that a guard band between each carrier may be based on a configuration in which a base station allocates the UE to a particular frequency resource based on the UE's capability. Alternatively, and/or in addition, a guard band between each carrier may be pre-configured and/or pre-specified. As another example, the signal may be multiplexed as a nested group of signals. Note that, in such instances, a guard band between nested groups of signals may be based on a configuration in which a base station allocates the UE to a particular frequency resource based on the UE's capability. Alternatively, and/or in addition, a guard band between nested groups of signals may be pre-configured and/or pre-specified.

In some embodiments, a bandwidth of the signal may be configured based on a signal to noise ratio (SNR) reported by the UE to a base station. For example, the bandwidth of the signal may be selected from a plurality of bandwidths based on the SNR. Further, a number of subcarriers used for the signal may be a function of a configured subcarrier spacing. Additionally, the UE may be grouped with other UEs in the bandwidth in a common time and frequency range.

In some embodiments, a beam schedule for a wakeup signal may be indicated to the wakeup radio. The indication of the beam schedule for the wakeup signal may be received from the primary communication radio. Alternatively, and/or in addition, the indication of the beam schedule for the wakeup signal may be signaled in a wakeup radio discovery channel. As a further option, the indication of the beam schedule for the wakeup signal may be signaled as part of a wakeup signal. In some instances, a length of the wakeup signal may be limited, e.g., to further conserve UE power and/or to further reduce UE power requirements. In some instances, the beam schedule may include a change in a receive beam at a specific time. In some instances, the beam schedule may include the wakeup signal being transmitted with different data on each of multiple frequencies.

Figure 20:
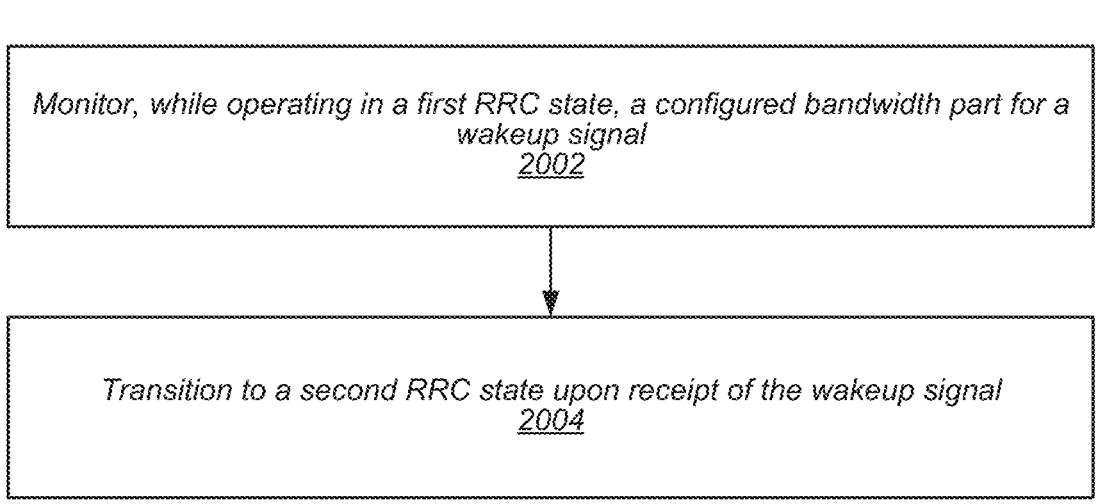
FIG. 20 illustrates a block diagram of an example of a method for monitoring for a wakeup signal via a wakeup radio of a UE, according to some embodiments.

FIG. 20 illustrates a block diagram of an example of a method for monitoring for a wakeup signal via a wakeup radio of a UE, according to some embodiments. The method shown in FIG. 20 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2002, a UE, such as UE 106, may monitor, while operating in a first radio resource control (RRC) state, a configured bandwidth part for a wakeup signal. A primary communication radio (e.g., a primary cellular radio and/or a primary short-to-medium range radio) of the UE may be powered off and a wakeup radio of the UE may be powered on in the first RRC state. Note that the first RRC state may be a low power RRC state such as an RRC wakeup radio (WUR) state or an RRC wakeup signal (WUS) state. Note that in at least some instances, the wakeup radio may be a wakeup receiver. In other words, the wakeup radio may only include a receiver and/or receive chain and may not include a transmitter and/or a transmit chain. Note additionally, that the wakeup receiver may be a low power and/or ultra-low power wakeup receiver.

At 2004, the UE may, upon receipt of the wakeup signal, transition to a second RRC state. Note that in the second RRC state, the primary communication radio of the UE may be powered on and the wakeup radio of the UE may be powered off. Note further that the second RRC state may any one of an RRC idle state, an RRC inactive state, and/or an RRC connected state. In at least some instances, the second RRC state may be equivalent to an RRC state the UE operated in prior to transitioning to the first RRC state. However, in at least some other instances, the second RRC state may be different than an RRC state the UE operated in prior to transitioning to the first RRC state. The transition to the second RRC state may occur prior to a bandwidth part switch from the configured bandwidth part. In such instances, the UE may transmit, to a base station, an indication of the transition to the second RRC state. The indication of the transition to the second RRC state may be sent via one of a scheduling request, a physical uplink control channel (PUCCH), and/or via another signal and/or signaling type. In some instances, the UE may be required, by a base station, to transition to the third RRC state within a specified amount of time after transmission of the wakeup signal. In some instances, the UE may, after transitioning to the second RRC state, transmit, to a base station, an acknowledgment. Note that when the UE does not transition to the second RRC state within the specified amount of time (e.g., when the base station does not receive an acknowledgement with the specified amount of time), the base station may retransmit the wakeup signal. The base station may retransmit the wakeup signal with one or more of a lower data rate or a higher power as compared to a prior wakeup signal. Further, the base station may retransmit the wakeup signal from another transmit receive point.

In some embodiments, prior to operating in the first RRC state, the UE may receive, while operating in a prior RRC state, a signal indicating a transition to the first RRC state. The signal may be received from a base station, such as base station 102. The primary communication radio of the UE may be powered on and the wakeup radio of the UE may be powered of in the prior RRC state. Note that the prior RRC state may any one of an RRC idle state, an RRC inactive state, and/or an RRC connected state The signal may be a physical layer signal, a medium access control (MAC) control element (CE), and/or an RRC message. The physical layer signal may include at least one of (e.g., any, any combination of, and/or all of) a paging early indicator (PEI), a downlink control indicator (DCI) received via a physical downlink control channel (PDDCH), a wakeup signal received via the PDDCH, and/or a signal including one or more bit indicators. The PEI may indicate an idle state. Further, the PEI may be a PEI as specified by 3GPP Release 17. The DCI may be a DCI format 2_6, e.g., may be a UE group common DCI. Thus, the wakeup signal may be a wakeup signal as specified by 3GPP Release 16. Alternatively, and/or in addition, the DCI may be a UE specific DCI, such as DCI format X_Y (e.g., such as DCI format 0_0, DCI format 0_1, DCI format 0_2, DCI format 1_0), DCI format 1_1, DCI format 1_2, and/or any other DCI format X_Y). Note that such a DCI format (e.g., a DCI format X_Y) may be UE specific. Note further, that a UE specific DCI format may indicate a bandwidth part switch. In addition, a type of the physical layer signal may be based, at least in part, on the first RRC state. Further, the UE may transition to the first RRC state based on receipt of the signal. Thus, the UE may power on the wakeup radio and power off the primary communication radio.

In some embodiments, the UE may receive, from a base station, such as base station 102, a configuration of one or more time and frequency resources for the wakeup radio to monitor. Additionally, the UE may monitor, after transitioning to the first RRC state, one or more bandwidth parts included in and/or specified by the one or more time and frequency resources. Note that the base station may configure the one or more bandwidth parts for wakeup radio monitoring and four bandwidth parts for non-wakeup radio communications. In addition, the one or more bandwidth parts for wakeup radio monitoring may include at least one bandwidth part for wakeup radio monitoring and at least one bandwidth part for radio resource management procedures, e.g., such as neighbor cell discovery. Further, the one or more bandwidth parts may be narrow band. In such instances the signal may be a wakeup signal including on-off key signaling. A bandwidth part size may be fixed as a multiple of a fixed bandwidth part and/or may be configurable to accommodate UE specific wakeup signal bandwidth and/or UE specific guard bands. Note that if and/or when the bandwidth part size is configurable, the bandwidth part size may be semi-statically or/or dynamically configurable. In some instances, a bandwidth part size may be configurable to accommodate UE group wakeup signal bandwidth and/or UE group guard bands. In such instances, the bandwidth part size may be semi-statically and/or dynamically configurable. In some instances, a subcarrier spacing of the one or more bandwidth parts may be fixed based on a frequency band. For example, when the frequency band is frequency range (FR) 1 (FR1), the subcarrier spacing may be 30 kilohertz. (30 kHz). As another example, when the frequency band is FR2, the subcarrier spacing may be 60 KHz. As a further example, when the frequency band is FR2-x, the subcarrier spacing may be 120 KHz. Note that these subcarrier spacing values are exemplary only and other fixed values can be used and/or considered. In other instances, a subcarrier spacing of the one or more bandwidth parts may be configurable. For example, a configuration of the subcarrier spacing may be included in the configuration. In some instances, the configuration of the one or more time and frequency resources for the wakeup radio to monitor may include only downlink symbols, e.g., may not include any uplink symbols and/or any special symbols.

In some embodiments, receiving, while operating in the prior RRC state, the signal indicating the transition to the first RRC state may include the UE monitoring, in a group common physical downlink control channel (PDCCH), for a first downlink control indicator (DCI) format for a duration of time. The duration of time may be defined as being from a configured offset before a start of a discontinuous reception (DRX) on cycle until an end of a configured range of monitoring. In some instances, the UE may determine that a threshold number of the first DCI format have been received from a base station without a wakeup indication. In such instances, the UE may transmit, to a base station, an indication of the transition to the second RRC state, e.g., based on determining that the threshold number of the first DCI format have been received. The indication of the transition to the second RRC state may be sent via one of a scheduling request, a physical uplink control channel (PUCCH), and/or via another signal and/or signaling type. In some instances, the UE may receive the first DCI format and determine that the first DCI format includes an indication to transition to the first RRC state. Then, based on the determination, the UE may transmit, to a base station, an indication of the transition to the second RRC state, e.g., as an acknowledgment of receipt of the first DCI format. In some instances, the indication of the transition to the first RRC state may be sent via one of a scheduling request, a physical uplink control channel (PUCCH), and/or via another signal and/or signaling type. In some instances, transitioning to the second RRC state based on receipt of the signal may include the UE performing a bandwidth part switch to time and frequency resources configured for wakeup radio monitoring.

In some embodiments, the UE receiving, while operating in the prior RRC state, the signal indicating the transition to the first RRC state may include the UE monitoring, in a group common physical downlink control channel (PDCCH), for a UE specific downlink control indicator (DCI) format for bandwidth part switching. In such instances, the UE transitioning to the first RRC state based on receipt of the signal may include the UE switching to a preconfigured bandwidth part for wakeup radio monitoring based on receipt of the UE specific DCI format. Note that the UE specific DCI format may include at least one of DCI format 0_0), DCI format 0_1, DCI format 0_2, DCI format 0_x, DCI format 1_0, DCI format 1_1, DCI format 1_2, or DCI format 1_x. In some instances, the UE may transmit, to a base station, an indication of the transition to the first RRC state. Note that such a transmission may occur prior to transitioning to the first RRC state. In some instances, the PDCCH may be received with a higher-than-normal aggregation level to ensure receipt of the UE specific DCI format. In some instances, the UE specific DCI format may be transmitted multiple times by a base station to ensure receipt of the UE specific DCI format.

In some embodiments, the signal may be multiplexed with one or more other signals in a time and frequency resource. For example, the signal may be multiplexed as a multi-carrier-on-off-key (MC-OOC) with a gap between carriers and time domain multiplexing of different groups within a bandwidth. Note that the gap may be a fixed gap and/or a configured gap. Note further that a guard band between each carrier may be based on a configuration in which a base station allocates the UE to a particular frequency resource based on the UE's capability. Alternatively, and/or in addition, a guard band between each carrier may be pre-configured and/or pre-specified. As another example, the signal may be multiplexed as a nested group of signals. Note that, in such instances, a guard band between nested groups of signals may be based on a configuration in which a base station allocates the UE to a particular frequency resource based on the UE's capability. Alternatively, and/or in addition, a guard band between nested groups of signals may be pre-configured and/or pre-specified.

In some embodiments, a bandwidth of the signal may be configured based on a signal to noise ratio (SNR) reported by the UE to a base station. For example, the bandwidth of the signal may be selected from a plurality of bandwidths based on the SNR. Further, a number of subcarriers used for the signal may be a function of a configured subcarrier spacing. Additionally, the UE may be grouped with other UEs in the bandwidth in a common time and frequency range.

In some embodiments, a beam schedule for the wakeup signal may be indicated to the wakeup radio. The indication of the beam schedule for the wakeup signal may be received from the primary communication radio. Alternatively, and/or in addition, the indication of the beam schedule for the wakeup signal may be signaled in a wakeup radio discovery channel. As a further option, the indication of the beam schedule for the wakeup signal may be signaled as part of a wakeup signal. In some instances, a length of the wakeup signal may be limited, e.g., to further conserve UE power and/or to further reduce UE power requirements. In some instances, the beam schedule may include a change in a receive beam at a specific time. In some instances, the beam schedule may include the wakeup signal being transmitted with different data on each of multiple frequencies.

Figure 21:
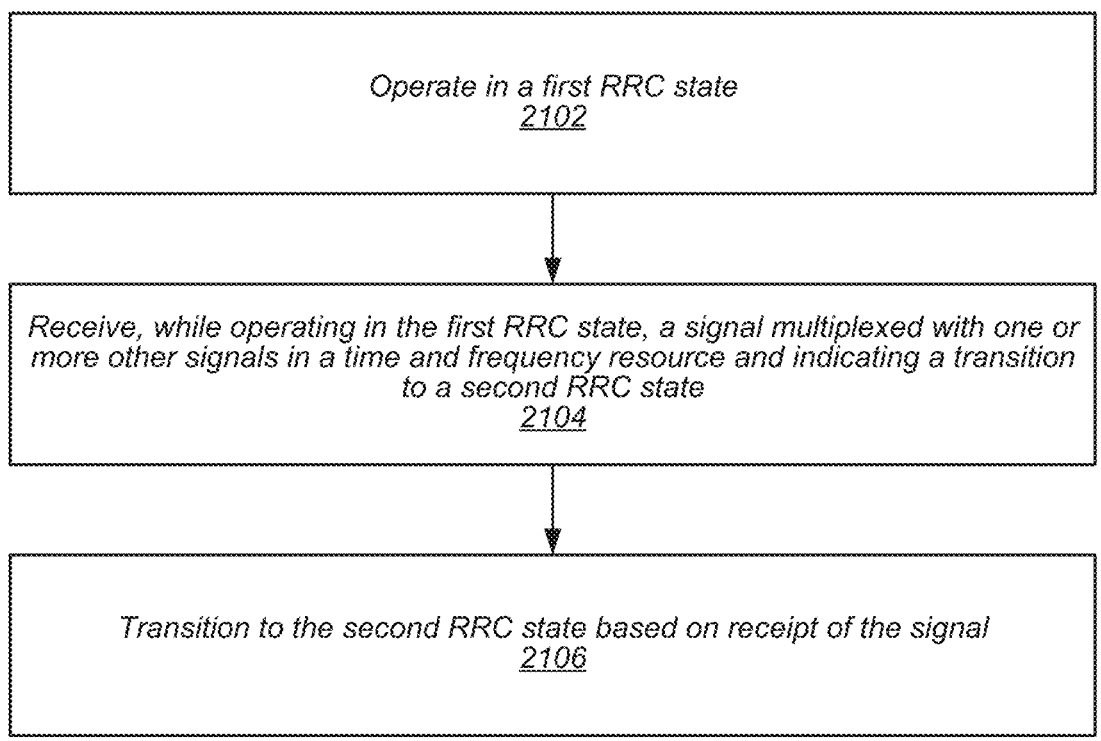
FIG. 21 illustrates a block diagram of a further example of a method for operating a wakeup radio of a UE, according to some embodiments.

FIG. 21 illustrates a block diagram of a further example of a method for operating a wakeup radio of a UE, according to some embodiments. The method shown in FIG. 21 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2102, a UE, such as UE 106, may operate in a first radio resource control (RRC) state. A primary communication radio (e.g., a primary cellular radio and/or a primary short-to-medium range radio) of the UE may be powered on and a wakeup radio of the UE may be powered off in the first RRC state. Note that the first RRC state may be any of an RRC idle state, an RRC inactive state, and/or an RRC connected state. Additionally, the second RRC state may be a low power RRC state such as an RRC wakeup radio (WUR) state or an RRC wakeup signal (WUS) state. Note that in at least some instances, the wakeup radio may be a wakeup receiver. In other words, the wakeup radio may only include a receiver and/or receive chain and may not include a transmitter and/or a transmit chain. Note additionally, that the wakeup receiver may be a low power and/or ultra-low power wakeup receiver.

At 2104, the UE may receive, while operating in the first RRC state, a signal multiplexed with one or more other signals in a time and frequency resource and indicating a transition to a second RRC state. For example, the signal may be multiplexed as a multi-carrier-on-off-key (MC-OOC) with a gap between carriers and time domain multiplexing of different groups within a bandwidth. Note that the gap may be a fixed gap and/or a configured gap. Note further that a guard band between each carrier may be based on a configuration in which a base station allocates the UE to a particular frequency resource based on the UE's capability. Alternatively, and/or in addition, a guard band between each carrier may be pre-configured and/or pre-specified. As another example, the signal may be multiplexed as a nested group of signals. Note that, in such instances, a guard band between nested groups of signals may be based on a configuration in which a base station allocates the UE to a particular frequency resource based on the UE's capability. Alternatively, and/or in addition, a guard band between nested groups of signals may be pre-configured and/or pre-specified.

Note that the signal may be received from a base station, such as base station 102. The primary communication radio of the UE may be powered off and the wakeup radio of the UE may be powered on in the second RRC state. The signal may be a physical layer signal, a medium access control (MAC) control element (CE), and/or an RRC message. The physical layer signal may include at least one of (e.g., any, any combination of, and/or all of) a paging early indicator (PEI), a downlink control indicator (DCI) received via a physical downlink control channel (PDDCH), a wakeup signal received via the PDDCH, and/or a signal including one or more bit indicators. The PEI may indicate an idle state. Further, the PEI may be a PEI as specified by 3GPP Release 17. The DCI may be a DCI format 2_6, e.g., may be a UE group common DCI. Thus, the wakeup signal may be a wakeup signal as specified by 3GPP Release 16. Alternatively, and/or in addition, the DCI may be a UE specific DCI, such as DCI format X_Y (e.g., such as DCI format 0_0, DCI format 0_1, DCI format 0_2, DCI format 1_0, DCI format 1_1, DCI format 1_2, and/or any other DCI format X_Y).

Note that such a DCI format (e.g., a DCI format X_Y) may be UE specific. Note further, that a UE specific DCI format may indicate a bandwidth part switch. In addition, a type of the physical layer signal may be based, at least in part, on the first RRC state.

At 2106, the UE may transition to the second RRC state based on receipt of the signal. Thus, the UE may power on the wakeup radio and power off the primary communication radio.

In some embodiments, the UE may receive, from a base station, such as base station 102, a configuration of one or more time and frequency resources for the wakeup radio to monitor. Additionally, the UE may monitor, after transitioning to the second RRC state, one or more bandwidth parts included in and/or specified by the one or more time and frequency resources. Note that the base station may configure the one or more bandwidth parts for wakeup radio monitoring and four bandwidth parts for non-wakeup radio communications. In addition, the one or more bandwidth parts for wakeup radio monitoring may include at least one bandwidth part for wakeup radio monitoring and at least one bandwidth part for radio resource management procedures, e.g., such as neighbor cell discovery. Further, the one or more bandwidth parts may be narrow band. In such instances the signal may be a wakeup signal including on-off key signaling. A bandwidth part size may be fixed as a multiple of a fixed bandwidth part and/or may be configurable to accommodate UE specific wakeup signal bandwidth and/or UE specific guard bands. Note that if and/or when the bandwidth part size is configurable, the bandwidth part size may be semi-statically or/or dynamically configurable. In some instances, a bandwidth part size may be configurable to accommodate UE group wakeup signal bandwidth and/or UE group guard bands. In such instances, the bandwidth part size may be semi-statically and/or dynamically configurable. In some instances, a subcarrier spacing of the one or more bandwidth parts may be fixed based on a frequency band. For example, when the frequency band is frequency range (FR) 1 (FR1), the subcarrier spacing may be 30 kilohertz. (30 kHz). As another example, when the frequency band is FR2, the subcarrier spacing may be 60 KHz. As a further example, when the frequency band is FR2-x, the subcarrier spacing may be 120 KHz. Note that these subcarrier spacing values are exemplary only and other fixed values can be used and/or considered. In other instances, a subcarrier spacing of the one or more bandwidth parts may be configurable. For example, a configuration of the subcarrier spacing may be included in the configuration. In some instances, the configuration of the one or more time and frequency resources for the wakeup radio to monitor may include only downlink symbols, e.g., may not include any uplink symbols and/or any special symbols.

In some embodiments, receiving, while operating in the first RRC state, the signal indicating the transition to the second RRC state may include the UE monitoring, in a group common physical downlink control channel (PDCCH), for a first downlink control indicator (DCI) format for a duration of time. The duration of time may be defined as being from a configured offset before a start of a discontinuous reception (DRX) on cycle until an end of a configured range of monitoring. In some instances, the UE may determine that a threshold number of the first DCI format have been received from a base station without a wakeup indication. In such instances, the UE may transmit, to a base station, an indication of the transition to the second RRC state, e.g., based on determining that the threshold number of the first DCI format have been received. The indication of the transition to the second RRC state may be sent via one of a scheduling request, a physical uplink control channel (PUCCH), and/or via another signal and/or signaling type. In some instances, the UE may receive the first DCI format and determine that the first DCI format includes an indication to transition to the second RRC state. Then, based on the determination, the UE may transmit, to a base station, an indication of the transition to the second RRC state, e.g., as an acknowledgment of receipt of the first DCI format. In some instances, the indication of the transition to the second RRC state may be sent via one of a scheduling request, a physical uplink control channel (PUCCH), and/or via another signal and/or signaling type. In some instances, transitioning to the second RRC state based on receipt of the signal may include the UE performing a bandwidth part switch to time and frequency resources configured for wakeup radio monitoring.

In some embodiments, the UE receiving, while operating in the first RRC state, the signal indicating the transition to the second RRC state may include the UE monitoring, in a group common physical downlink control channel (PDCCH), for a UE specific downlink control indicator (DCI) format for bandwidth part switching. In such instances, the UE transitioning to the second RRC state based on receipt of the signal may include the UE switching to a preconfigured bandwidth part for wakeup radio monitoring based on receipt of the UE specific DCI format. Note that the UE specific DCI format may include at least one of DCI format 0_0, DCI format 0_1, DCI format 0_2, DCI format 0_x, DCI format 1_0, DCI format 1_1, DCI format 1_2, or DCI format 1_x. In some instances, the UE may transmit, to a base station, an indication of the transition to the second RRC state. Note that such a transmission may occur prior to transitioning to the second RRC state. In some instances, the PDCCH may be received with a higher-than-normal aggregation level to ensure receipt of the UE specific DCI format. In some instances, the UE specific DCI format may be transmitted multiple times by a base station to ensure receipt of the UE specific DCI format.

In some embodiments, the UE may monitor, while operating in the second RRC state, a configured bandwidth part. Then, upon receipt of a wakeup signal, the UE may transition to a third RRC state. Note that in the third RRC state, the primary communication radio of the UE may be powered on and the wakeup radio of the UE may be powered off. Note further that the third RRC state may any one of an RRC idle state, an RRC inactive state, and/or an RRC connected state. In at least some instances, the third RRC state may be equivalent to the first RRC state. However, in at least some other instances, the third RRC state may be different than the first RRC state. The transition to the third RRC state may occur prior to a bandwidth part switch from the configured bandwidth part. In such instances, the UE may transmit, to a base station, an indication of the transition to the third RRC state. The indication of the transition to the third RRC state may be sent via one of a scheduling request, a physical uplink control channel (PUCCH), and/or via another signal and/or signaling type. In some instances, the UE may be required, by a base station, to transition to the third RRC state within a specified amount of time after transmission of the wakeup signal. In some instances, the UE may, after transitioning to the third RRC state, transmit, to a base station, an acknowledgment. Note that when the UE does not transition to the third RRC state within the specified amount of time (e.g., when the base station does not receive an acknowledgement with the specified amount of time), the base station may retransmit the wakeup signal. The base station may retransmit the wakeup signal with one or more of a lower data rate or a higher power as compared to a prior wakeup signal. Further, the base station may retransmit the wakeup signal from another transmit receive point.

In some embodiments, a bandwidth of the signal may be configured based on a signal to noise ratio (SNR) reported by the UE to a base station. For example, the bandwidth of the signal may be selected from a plurality of bandwidths based on the SNR. Further, a number of subcarriers used for the signal may be a function of a configured subcarrier spacing. Additionally, the UE may be grouped with other UEs in the bandwidth in a common time and frequency range.

In some embodiments, a beam schedule for a wakeup signal may be indicated to the wakeup radio. The indication of the beam schedule for the wakeup signal may be received from the primary communication radio. Alternatively, and/or in addition, the indication of the beam schedule for the wakeup signal may be signaled in a wakeup radio discovery channel. As a further option, the indication of the beam schedule for the wakeup signal may be signaled as part of a wakeup signal. In some instances, a length of the wakeup signal may be limited, e.g., to further conserve UE power and/or to further reduce UE power requirements. In some instances, the beam schedule may include a change in a receive beam at a specific time. In some instances, the beam schedule may include the wakeup signal being transmitted with different data on each of multiple frequencies.

Figure 22:
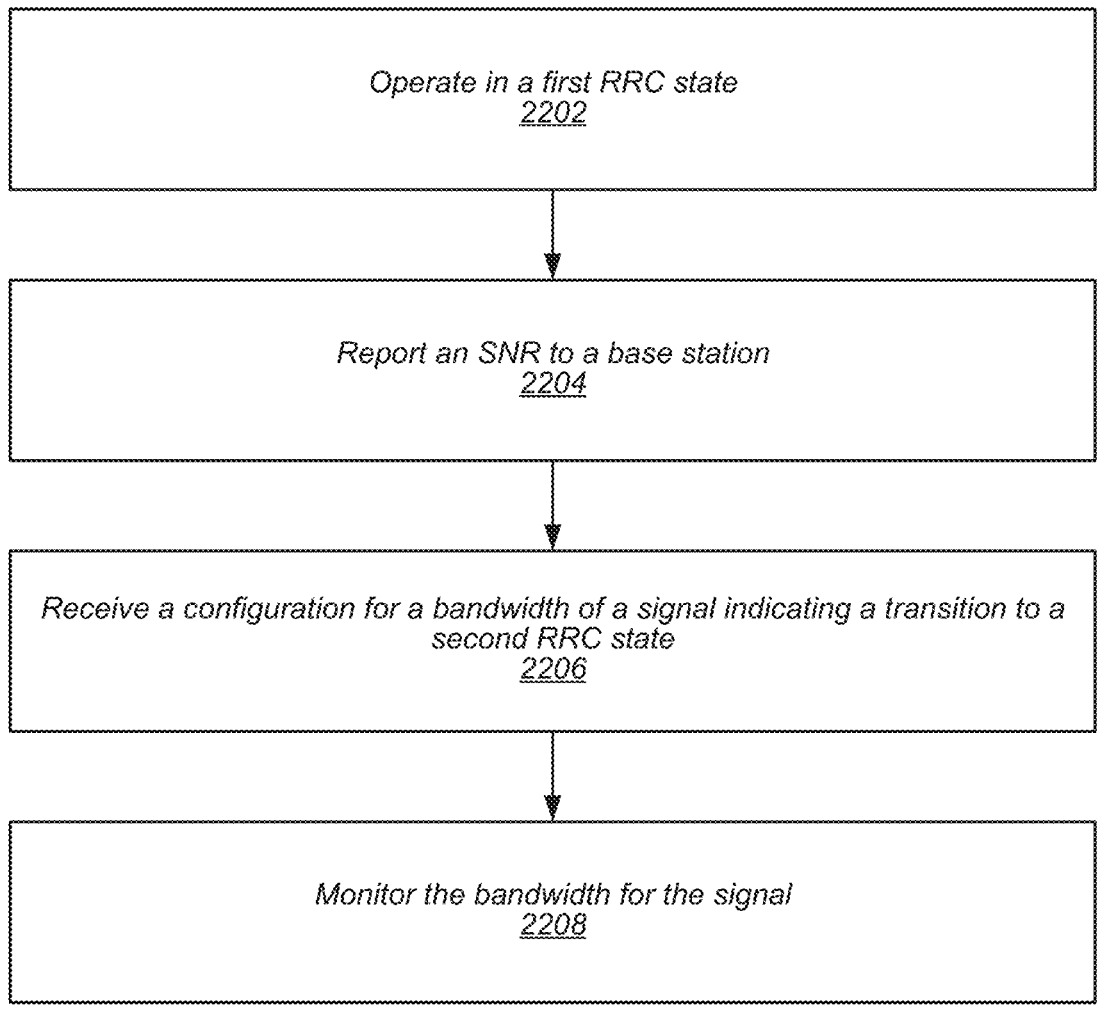
FIG. 22 illustrates a block diagram of a yet further example of a method for operating a wakeup radio of a UE, according to some embodiments.

FIG. 22 illustrates a block diagram of a yet further example of a method for operating a wakeup radio of a UE, according to some embodiments. The method shown in FIG. 22 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2202, a UE, such as UE 106, may operate in a first radio resource control (RRC) state. A primary communication radio (e.g., a primary cellular radio and/or a primary short-to-medium range radio) of the UE may be powered on and a wakeup radio of the UE may be powered off in the first RRC state. Note that the first RRC state may be any of an RRC idle state, an RRC inactive state, and/or an RRC connected state.

At 2204, the UE may report, to a base station, such as base station 102, a signal to noise ratio (SNR).

At 2206, the UE may receive, from the base station, a configuration for a bandwidth of a signal indicating a transition to a second RRC state. The bandwidth of the signal may be based on the SNR reported by the UE. For example, the bandwidth of the signal may be selected from a plurality of bandwidths based on the SNR. Further, a number of subcarriers used for the signal may be a function of a configured subcarrier spacing. Additionally, the UE may be grouped with other UEs in the bandwidth in a common time and frequency range. Note that the primary communication radio of the UE may be powered off and the wakeup radio of the UE may be powered on in the second RRC state. Note further that the second RRC state may be a low power RRC state such as an RRC wakeup radio (WUR) state or an RRC wakeup signal (WUS) state. In at least some instances, the wakeup radio may be a wakeup receiver. In other words, the wakeup radio may only include a receiver and/or receive chain and may not include a transmitter and/or a transmit chain. Note additionally, that the wakeup receiver may be a low power and/or ultra-low power wakeup receiver.

At 2208, the UE may monitor the bandwidth, while operating in the first RRC state, for the signal. The signal may be a physical layer signal, a medium access control (MAC) control element (CE), and/or an RRC message. The physical layer signal may include at least one of (e.g., any, any combination of, and/or all of) a paging early indicator (PEI), a downlink control indicator (DCI) received via a physical downlink control channel (PDDCH), a wakeup signal received via the PDDCH, and/or a signal including one or more bit indicators. The PEI may indicate an idle state. Further, the PEI may be a PEI as specified by 3GPP Release 17. The DCI may be a DCI format 2_6, e.g., may be a UE group common DCI. Thus, the wakeup signal may be a wakeup signal as specified by 3GPP Release 16. Alternatively, and/or in addition, the DCI may be a UE specific DCI, such as DCI format X_Y (e.g., such as DCI format 0_0, DCI format 0_1, DCI format 0_2, DCI format 1_0, DCI format 1_1, DCI format 1_2, and/or any other DCI format X_Y). Note that such a DCI format (e.g., a DCI format X_Y) may be UE specific. Note further, that a UE specific DCI format may indicate a bandwidth part switch. In addition, a type of the physical layer signal may be based, at least in part, on the first RRC state.

In some embodiments, the UE may transition to the second RRC state based on receipt of the signal. Thus, the UE may power on the wakeup radio and power off the primary communication radio.

In some embodiments, the UE may receive, from a base station, such as base station 102, a configuration of one or more time and frequency resources for the wakeup radio to monitor. Additionally, the UE may monitor, after transitioning to the second RRC state, one or more bandwidth parts included in and/or specified by the one or more time and frequency resources. Note that the base station may configure the one or more bandwidth parts for wakeup radio monitoring and four bandwidth parts for non-wakeup radio communications. In addition, the one or more bandwidth parts for wakeup radio monitoring may include at least one bandwidth part for wakeup radio monitoring and at least one bandwidth part for radio resource management procedures, e.g., such as neighbor cell discovery. Further, the one or more bandwidth parts may be narrow band. In such instances the signal may be a wakeup signal including on-off key signaling. A bandwidth part size may be fixed as a multiple of a fixed bandwidth part and/or may be configurable to accommodate UE specific wakeup signal bandwidth and/or UE specific guard bands. Note that if and/or when the bandwidth part size is configurable, the bandwidth part size may be semi-statically or/or dynamically configurable. In some instances, a bandwidth part size may be configurable to accommodate UE group wakeup signal bandwidth and/or UE group guard bands. In such instances, the bandwidth part size may be semi-statically and/or dynamically configurable. In some instances, a subcarrier spacing of the one or more bandwidth parts may be fixed based on a frequency band. For example, when the frequency band is frequency range (FR) 1 (FR1), the subcarrier spacing may be 30 kilohertz. (30 kHz). As another example, when the frequency band is FR2, the subcarrier spacing may be 60 KHz. As a further example, when the frequency band is FR2-x, the subcarrier spacing may be 120 KHz. Note that these subcarrier spacing values are exemplary only and other fixed values can be used and/or considered. In other instances, a subcarrier spacing of the one or more bandwidth parts may be configurable. For example, a configuration of the subcarrier spacing may be included in the configuration. In some instances, the configuration of the one or more time and frequency resources for the wakeup radio to monitor may include only downlink symbols, e.g., may not include any uplink symbols and/or any special symbols.

In some embodiments, receiving, while operating in the first RRC state, the signal indicating the transition to the second RRC state may include the UE monitoring, in a group common physical downlink control channel (PDCCH), for a first downlink control indicator (DCI) format for a duration of time. The duration of time may be defined as being from a configured offset before a start of a discontinuous reception (DRX) on cycle until an end of a configured range of monitoring. In some instances, the UE may determine that a threshold number of the first DCI format have been received from a base station without a wakeup indication. In such instances, the UE may transmit, to a base station, an indication of the transition to the second RRC state, e.g., based on determining that the threshold number of the first DCI format have been received. The indication of the transition to the second RRC state may be sent via one of a scheduling request, a physical uplink control channel (PUCCH), and/or via another signal and/or signaling type. In some instances, the UE may receive the first DCI format and determine that the first DCI format includes an indication to transition to the second RRC state. Then, based on the determination, the UE may transmit, to a base station, an indication of the transition to the second RRC state, e.g., as an acknowledgment of receipt of the first DCI format. In some instances, the indication of the transition to the second RRC state may be sent via one of a scheduling request, a physical uplink control channel (PUCCH), and/or via another signal and/or signaling type. In some instances, transitioning to the second RRC state based on receipt of the signal may include the UE performing a bandwidth part switch to time and frequency resources configured for wakeup radio monitoring.

In some embodiments, the UE receiving, while operating in the first RRC state, the signal indicating the transition to the second RRC state may include the UE monitoring, in a group common physical downlink control channel (PDCCH), for a UE specific downlink control indicator (DCI) format for bandwidth part switching. In such instances, the UE transitioning to the second RRC state based on receipt of the signal may include the UE switching to a preconfigured bandwidth part for wakeup radio monitoring based on receipt of the UE specific DCI format. Note that the UE specific DCI format may include at least one of DCI format 0_0, DCI format 0_1, DCI format 0_2, DCI format 0_x, DCI format 1_0, DCI format 1_1, DCI format 1_2, or DCI format 1_x. In some instances, the UE may transmit, to a base station, an indication of the transition to the second RRC state. Note that such a transmission may occur prior to transitioning to the second RRC state. In some instances, the PDCCH may be received with a higher-than-normal aggregation level to ensure receipt of the UE specific DCI format. In some instances, the UE specific DCI format may be transmitted multiple times by a base station to ensure receipt of the UE specific DCI format.

In some embodiments, the UE may monitor, while operating in the second RRC state, a configured bandwidth part. Then, upon receipt of a wakeup signal, the UE may transition to a third RRC state. Note that in the third RRC state, the primary communication radio of the UE may be powered on and the wakeup radio of the UE may be powered off. Note further that the third RRC state may any one of an RRC idle state, an RRC inactive state, and/or an RRC connected state. In at least some instances, the third RRC state may be equivalent to the first RRC state. However, in at least some other instances, the third RRC state may be different than the first RRC state. The transition to the third RRC state may occur prior to a bandwidth part switch from the configured bandwidth part. In such instances, the UE may transmit, to a base station, an indication of the transition to the third RRC state. The indication of the transition to the third RRC state may be sent via one of a scheduling request, a physical uplink control channel (PUCCH), and/or via another signal and/or signaling type. In some instances, the UE may be required, by a base station, to transition to the third RRC state within a specified amount of time after transmission of the wakeup signal. In some instances, the UE may, after transitioning to the third RRC state, transmit, to a base station, an acknowledgment. Note that when the UE does not transition to the third RRC state within the specified amount of time (e.g., when the base station does not receive an acknowledgement with the specified amount of time), the base station may retransmit the wakeup signal. The base station may retransmit the wakeup signal with one or more of a lower data rate or a higher power as compared to a prior wakeup signal. Further, the base station may retransmit the wakeup signal from another transmit receive point.

In some embodiments, the signal may be multiplexed with one or more other signals in a time and frequency resource. For example, the signal may be multiplexed as a multi-carrier-on-off-key (MC-OOC) with a gap between carriers and time domain multiplexing of different groups within a bandwidth. Note that the gap may be a fixed gap and/or a configured gap. Note further that a guard band between each carrier may be based on a configuration in which a base station allocates the UE to a particular frequency resource based on the UE's capability. Alternatively, and/or in addition, a guard band between each carrier may be pre-configured and/or pre-specified. As another example, the signal may be multiplexed as a nested group of signals. Note that, in such instances, a guard band between nested groups of signals may be based on a configuration in which a base station allocates the UE to a particular frequency resource based on the UE's capability. Alternatively, and/or in addition, a guard band between nested groups of signals may be pre-configured and/or pre-specified.

In some embodiments, a bandwidth of the signal may be configured based on a signal to noise ratio (SNR) reported by the UE to a base station. For example, the bandwidth of the signal may be selected from a plurality of bandwidths based on the SNR. Further, a number of subcarriers used for the signal may be a function of a configured subcarrier spacing. Additionally, the UE may be grouped with other UEs in the bandwidth in a common time and frequency range.

In some embodiments, a beam schedule for a wakeup signal may be indicated to the wakeup radio. The indication of the beam schedule for the wakeup signal may be received from the primary communication radio. Alternatively, and/or in addition, the indication of the beam schedule for the wakeup signal may be signaled in a wakeup radio discovery channel. As a further option, the indication of the beam schedule for the wakeup signal may be signaled as part of a wakeup signal. In some instances, a length of the wakeup signal may be limited, e.g., to further conserve UE power and/or to further reduce UE power requirements. In some instances, the beam schedule may include a change in a receive beam at a specific time. In some instances, the beam schedule may include the wakeup signal being transmitted with different data on each of multiple frequencies.

Figure 23:
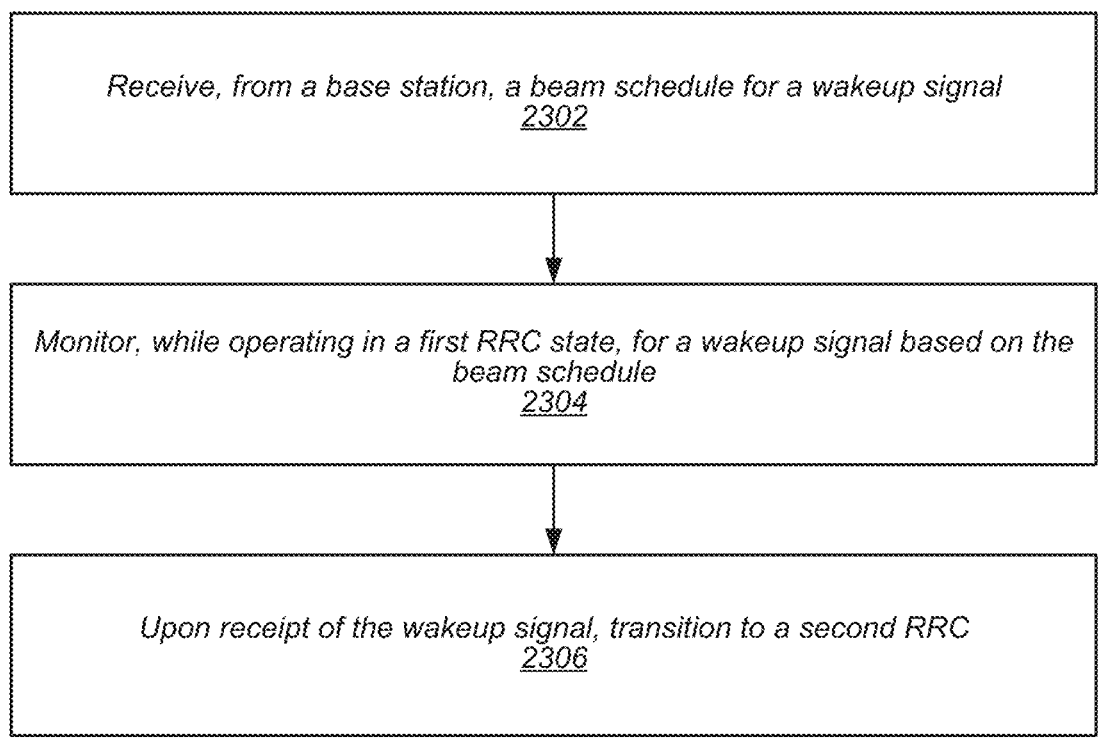
FIG. 23 illustrates a block diagram of another example of a method for monitoring a wakeup signal by a wakeup radio of a UE, according to some embodiments.

FIG. 23 illustrates a block diagram of another example of a method for monitoring a wakeup signal by a wakeup radio of a UE, according to some embodiments. The method shown in FIG. 23 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2302, a UE, such as UE 106, may receive, from a base station, such as base station 102, a beam schedule for a wakeup signal. The beam schedule may be indicated to a wakeup radio of the UE. For example, an indication of the beam schedule for the wakeup signal may be received from the primary communication radio (e.g., a primary cellular radio and/or a primary short-to-medium range radio) and transferred to the wakeup radio. Alternatively, and/or in addition, the indication of the beam schedule for the wakeup signal may be signaled in a wakeup radio discovery channel and received by the wakeup radio. As a further option, the indication of the beam schedule for the wakeup signal may be signaled as part of a wakeup signal. In some instances, a length of the wakeup signal may be limited, e.g., to further conserve UE power and/or to further reduce UE power requirements. In some instances, the beam schedule may include a change in a receive beam at a specific time. In some instances, the beam schedule may include the wakeup signal being transmitted with different data on each of multiple frequencies.

At 2304, the UE may monitor, while operating in a first radio resource control (RRC) state, for a wakeup signal, e.g., based on the beam schedule. A primary communication radio of the UE may be powered off and a wakeup radio of the UE may be powered on in the first RRC state. Note that the first RRC state may be may be a low power RRC state such as an RRC wakeup radio (WUR) state or an RRC wakeup signal (WUS) state. Note that in at least some instances, the wakeup radio may be a wakeup receiver. In other words, the wakeup radio may only include a receiver and/or receive chain and may not include a transmitter and/or a transmit chain. Note additionally, that the wakeup receiver may be a low power and/or ultra-low power wakeup receiver.

At 2306, the UE may, upon receipt of the wakeup signal, transition to a second RRC state. Note that in the second RRC state, the primary communication radio of the UE may be powered on and the wakeup radio of the UE may be powered off. Note further that the second RRC state may any one of an RRC idle state, an RRC inactive state, and/or an RRC connected state. In at least some instances, the second RRC state may be equivalent to an RRC state the UE operated in prior to transitioning to the first RRC state. However, in at least some other instances, the second RRC state may be different than an RRC state the UE operated in prior to transitioning to the first RRC state.

In some embodiments, prior to operating in the first RRC state, the UE may receive, while operating in a prior RRC state, a signal indicating a transition to the first RRC state. The signal may be received from a base station, such as base station 102. The primary communication radio of the UE may be powered on and the wakeup radio of the UE may be powered of in the prior RRC state. Note that the prior RRC state may any one of an RRC idle state, an RRC inactive state, and/or an RRC connected state The signal may be a physical layer signal, a medium access control (MAC) control element (CE), and/or an RRC message. The physical layer signal may include at least one of (e.g., any, any combination of, and/or all of) a paging early indicator (PEI), a downlink control indicator (DCI) received via a physical downlink control channel (PDDCH), a wakeup signal received via the PDDCH, and/or a signal including one or more bit indicators. The PEI may indicate an idle state. Further, the PEI may be a PEI as specified by 3GPP Release 17. The DCI may be a DCI format 2_6, e.g., may be a UE group common DCI. Thus, the wakeup signal may be a wakeup signal as specified by 3GPP Release 16. Alternatively, and/or in addition, the DCI may be a UE specific DCI, such as DCI format X_Y (e.g., such as DCI format 0_0, DCI format 0_1, DCI format 0_2, DCI format 1_0, DCI format 1_1, DCI format 1_2, and/or any other DCI format X_Y). Note that such a DCI format (e.g., a DCI format X_Y) may be UE specific. Note further, that a UE specific DCI format may indicate a bandwidth part switch. In addition, a type of the physical layer signal may be based, at least in part, on the first RRC state. Further, the UE may transition to the first RRC state based on receipt of the signal. Thus, the UE may power on the wakeup radio and power off the primary communication radio.

In some embodiments, the UE may receive, from a base station, such as base station 102, a configuration of one or more time and frequency resources for the wakeup radio to monitor. Additionally, the UE may monitor, after transitioning to the first RRC state, one or more bandwidth parts included in and/or specified by the one or more time and frequency resources. Note that the base station may configure the one or more bandwidth parts for wakeup radio monitoring and four bandwidth parts for non-wakeup radio communications. In addition, the one or more bandwidth parts for wakeup radio monitoring may include at least one bandwidth part for wakeup radio monitoring and at least one bandwidth part for radio resource management procedures, e.g., such as neighbor cell discovery. Further, the one or more bandwidth parts may be narrow band. In such instances the signal may be a wakeup signal including on-off key signaling. A bandwidth part size may be fixed as a multiple of a fixed bandwidth part and/or may be configurable to accommodate UE specific wakeup signal bandwidth and/or UE specific guard bands. Note that if and/or when the bandwidth part size is configurable, the bandwidth part size may be semi-statically or/and dynamically configurable. In some instances, a bandwidth part size may be configurable to accommodate UE group wakeup signal bandwidth and/or UE group guard bands. In such instances, the bandwidth part size may be semi-statically and/or dynamically configurable. In some instances, a subcarrier spacing of the one or more bandwidth parts may be fixed based on a frequency band. For example, when the frequency band is frequency range (FR) 1 (FR1), the subcarrier spacing may be 30 kilohertz (30 kHz). As another example, when the frequency band is FR2, the subcarrier spacing may be 60 KHz. As a further example, when the frequency band is FR2-x, the subcarrier spacing may be 120 kHz. Note that these subcarrier spacing values are exemplary only and other fixed values can be used and/or considered. In other instances, a subcarrier spacing of the one or more bandwidth parts may be configurable. For example, a configuration of the subcarrier spacing may be included in the configuration. In some instances, the configuration of the one or more time and frequency resources for the wakeup radio to monitor may include only downlink symbols, e.g., may not include any uplink symbols and/or any special symbols.

In some embodiments, receiving, while operating in the prior RRC state, the signal indicating the transition to the first RRC state may include the UE monitoring, in a group common physical downlink control channel (PDCCH), for a first downlink control indicator (DCI) format for a duration of time. The duration of time may be defined as being from a configured offset before a start of a discontinuous reception (DRX) on cycle until an end of a configured range of monitoring. In some instances, the UE may determine that a threshold number of the first DCI format have been received from a base station without a wakeup indication. In such instances, the UE may transmit, to a base station, an indication of the transition to the second RRC state, e.g., based on determining that the threshold number of the first DCI format have been received. The indication of the transition to the second RRC state may be sent via one of a scheduling request, a physical uplink control channel (PUCCH), and/or via another signal and/or signaling type. In some instances, the UE may receive the first DCI format and determine that the first DCI format includes an indication to transition to the first RRC state. Then, based on the determination, the UE may transmit, to a base station, an indication of the transition to the second RRC state, e.g., as an acknowledgment of receipt of the first DCI format. In some instances, the indication of the transition to the first RRC state may be sent via one of a scheduling request, a physical uplink control channel (PUCCH), and/or via another signal and/or signaling type. In some instances, transitioning to the second RRC state based on receipt of the signal may include the UE performing a bandwidth part switch to time and frequency resources configured for wakeup radio monitoring.

In some embodiments, monitoring for the wakeup signal may include the UE monitoring the configured bandwidth part for a wakeup signal. Further, upon receipt of the wakeup signal, the UE transition to a second RRC state. Note that in the second RRC state, the primary communication radio of the UE may be powered on and the wakeup radio of the UE may be powered off. Note further that the second RRC state may any one of an RRC idle state, an RRC inactive state, and/or an RRC connected state. In at least some instances, the second RRC state may be equivalent to an RRC state the UE operated in prior to transitioning to the first RRC state. However, in at least some other instances, the second RRC state may be different than an RRC state the UE operated in prior to transitioning to the first RRC state. The transition to the second RRC state may occur prior to a bandwidth part switch from the configured bandwidth part. In such instances, the UE may transmit, to a base station, an indication of the transition to the second RRC state. The indication of the transition to the second RRC state may be sent via one of a scheduling request, a physical uplink control channel (PUCCH), and/or via another signal and/or signaling type. In some instances, the UE may be required, by a base station, to transition to the third RRC state within a specified amount of time after transmission of the wakeup signal. In some instances, the UE may, after transitioning to the second RRC state, transmit, to a base station, an acknowledgment. Note that when the UE does not transition to the second RRC state within the specified amount of time (e.g., when the base station does not receive an acknowledgement with the specified amount of time), the base station may retransmit the wakeup signal. The base station may retransmit the wakeup signal with one or more of a lower data rate or a higher power as compared to a prior wakeup signal. Further, the base station may retransmit the wakeup signal from another transmit receive point.

In some embodiments, the UE receiving, while operating in the prior RRC state, the signal indicating the transition to the first RRC state may include the UE monitoring, in a group common physical downlink control channel (PDCCH), for a UE specific downlink control indicator (DCI) format for bandwidth part switching. In such instances, the UE transitioning to the first RRC state based on receipt of the signal may include the UE switching to a preconfigured bandwidth part for wakeup radio monitoring based on receipt of the UE specific DCI format. Note that the UE specific DCI format may include at least one of DCI format 0_0, DCI format 0_1, DCI format 0_2, DCI format 0_x, DCI format 1_0, DCI format 1_1, DCI format 1_2, or DCI format 1_x. In some instances, the UE may transmit, to a base station, an indication of the transition to the first RRC state. Note that such a transmission may occur prior to transitioning to the first RRC state. In some instances, the PDCCH may be received with a higher-than-normal aggregation level to ensure receipt of the UE specific DCI format. In some instances, the UE specific DCI format may be transmitted multiple times by a base station to ensure receipt of the UE specific DCI format.

In some embodiments, the signal may be multiplexed with one or more other signals in a time and frequency resource. For example, the signal may be multiplexed as a multi-carrier-on-off-key (MC-OOC) with a gap between carriers and time domain multiplexing of different groups within a bandwidth. Note that the gap may be a fixed gap and/or a configured gap. Note further that a guard band between each carrier may be based on a configuration in which a base station allocates the UE to a particular frequency resource based on the UE's capability. Alternatively, and/or in addition, a guard band between each carrier may be pre-configured and/or pre-specified. As another example, the signal may be multiplexed as a nested group of signals. Note that, in such instances, a guard band between nested groups of signals may be based on a configuration in which a base station allocates the UE to a particular frequency resource based on the UE's capability. Alternatively, and/or in addition, a guard band between nested groups of signals may be pre-configured and/or pre-specified.

In some embodiments, a bandwidth of the signal may be configured based on a signal to noise ratio (SNR) reported by the UE to a base station. For example, the bandwidth of the signal may be selected from a plurality of bandwidths based on the SNR. Further, a number of subcarriers used for the signal may be a function of a configured subcarrier spacing. Additionally, the UE may be grouped with other UEs in the bandwidth in a common time and frequency range.

In some embodiments, a beam schedule for the wakeup signal may be indicated to the wakeup radio. The indication of the beam schedule for the wakeup signal may be received from the primary communication radio. Alternatively, and/or in addition, the indication of the beam schedule for the wakeup signal may be signaled in a wakeup radio discovery channel. As a further option, the indication of the beam schedule for the wakeup signal may be signaled as part of a wakeup signal. In some instances, a length of the wakeup signal may be limited, e.g., to further conserve UE power and/or to further reduce UE power requirements. In some instances, the beam schedule may include a change in a receive beam at a specific time. In some instances, the beam schedule may include the wakeup signal being transmitted with different data on each of multiple frequencies.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a memory; and
at least one processor in communication with the memory, wherein the at least one processor is configured to:
operate in a first radio resource control (RRC) state, wherein, in the first RRC state, a wakeup radio in communication with the apparatus is powered off;
receive, in a group common physical downlink control channel (PDCCH), a downlink control indicator (DCI) having a first format; and
initiate a transition to a second RRC state based on receipt of the first DCI having the first format, wherein the wakeup radio in communication with apparatus is powered on in the second RRC state.

2. The apparatus of claim 1,
wherein the at least one processor is further configured to:
monitor for the DCI for a duration of time, wherein the duration of time is from a configured offset before a start of a discontinuous reception (DRX) on cycle until an end of a configured range of monitoring.

3. The apparatus of claim 1,
wherein the at least one processor is further configured to:
determine that a threshold number of DCIs having the first format have been received from a base station without a wakeup indication; and
transmit, to the base station, an indication of the transition to the second RRC state, wherein the indication of the transition to the second RRC state is sent via one of a scheduling request or a physical uplink control channel (PUCCH).

4. The apparatus of claim 1,
wherein the at least one processor is further configured to:
determine that the DCI having the first format includes an indication to transition to the second RRC state; and
transmit, to a base station, an indication of the transition to the second RRC state, wherein the indication of the transition to the second RRC state is sent via one of a scheduling request or a physical uplink control channel (PUCCH).

5. The apparatus of claim 1,
wherein the at least one processor is further configured to:
receive, from a base station, a configuration of one or more time and frequency resources for the wakeup radio to monitor; and
monitor, after transitioning to the second RRC state, the one or more time and frequency resources for a signal via the wakeup radio.

6. The apparatus of claim 5,
wherein the configuration of the one or more time and frequency resources for the wakeup radio to monitor includes only downlink symbols.

7. The apparatus of claim 5,
wherein the signal is a wakeup signal including on-off key signaling.

8. A non-transitory computer readable memory medium storing program instructions executable by processing circuitry to cause a user equipment device (UE) to:
operate in a first radio resource control (RRC) state, wherein, in the first RRC state, a primary communication radio of the UE is powered on and a wakeup radio of the UE is powered off
monitor, in a group common physical downlink control channel (PDCCH), for a UE specific downlink control indicator (DCI) format for bandwidth part switching; and
switch to a preconfigured bandwidth part for wakeup radio monitoring based on receipt of the UE specific DCI format.

9. The non-transitory computer readable memory medium of claim 8,
wherein the UE specific DCI format includes at least one of DCI format 0_0, DCI format 0_1, DCI format 0_2, DCI format 0_x, DCI format 1_0, DCI format 1_1, DCI format 1_2, or DCI format 1_x.

10. The non-transitory computer readable memory medium of claim 8,
wherein the PDCCH is received with a higher than normal aggregation level to ensure receipt of the UE specific DCI format.

11. The non-transitory computer readable memory medium of claim 8,
wherein the UE specific DCI format is transmitted multiple times by a base station to ensure receipt of the UE specific DCI format.

12. The non-transitory computer readable memory medium of claim 8,
wherein the program instructions are further executable by the processing circuitry to cause the UE to:
upon receipt of a wakeup signal, transitioning to a second RRC state, wherein, in the second RRC state, the primary communication radio of the UE is powered on and the wakeup radio of the UE is powered off, wherein the second RRC state is one of an RRC idle state, an RRC inactive state, or an RRC connected state, wherein the second RRC state is equivalent to the first RRC state, wherein the transition to the second RRC state occurs prior to a bandwidth part switch from the preconfigured bandwidth part; and wherein the program instructions are further executable by the processing circuitry to cause the UE to:
transmit, to a base station, an indication of the transition to the second RRC state, wherein the indication of the transition to the second RRC state is sent via one of a scheduling request or a physical uplink control channel (PUCCH).

13. The non-transitory computer readable memory medium of claim 8,
wherein a beam schedule for a wakeup signal is indicated to the wakeup radio, wherein the indication of the beam schedule for the wakeup signal is received from the primary communication radio, signaled in a wakeup radio discovery channel, or signaled as part of a wakeup signal, wherein the beam schedule includes a change in a receive beam at a specific time, and wherein the beam schedule includes the wakeup signal being transmitted with different data on each of multiple frequencies.

14. A method, comprising:
operating in a first radio resource control (RRC) state, wherein, in the first RRC state, a wakeup radio is powered off;
monitoring, in a group common physical downlink control channel (PDCCH), for a first downlink control indicator (DCI) format for a duration of time; and
initiating a transition to a second RRC state based on receipt of the first DCI format, wherein the wakeup radio is powered on in the second RRC state.

15. The method of claim 14, further comprising:
receiving, from a base station, a configuration of one or more time and frequency resources for the wakeup radio to monitor; and
monitoring, after transitioning to the second RRC state, the one or more time and frequency resources for a signal via the wakeup radio.

16. The method of claim 15,
wherein the configuration of the one or more time and frequency resources for the wakeup radio to monitor includes only downlink symbols.

17. The method of claim 15,
wherein the signal is a wakeup signal including on-off key signaling.

18. The method of claim 14,
wherein the duration of time is from a configured offset before a start of a discontinuous reception (DRX) on cycle until an end of a configured range of monitoring.

19. The method of claim 14, further comprising:
determining that a threshold number of the first DCI format have been received from a base station without a wakeup indication; and
transmitting, to the base station, an indication of the transition to the second RRC state, wherein the indication of the transition to the second RRC state is sent via one of a scheduling request or a physical uplink control channel (PUCCH).

20. The method of claim 14, further comprising:
receiving the first DCI format;
determining that the first DCI format includes an indication to transition to the second RRC state; and
transmitting, to a base station, an indication of the transition to the second RRC state, wherein the indication of the transition to the second RRC state is sent via one of a scheduling request or a physical uplink control channel (PUCCH).

\* \* \* \* \*

UNITED STATES PATENT AND TRADEMARK OFFICE
CERTIFICATE OF CORRECTION

| | | |
|---|---|---|
| PATENT NO. | : 12,464,595 B2 | Page 1 of 1 |
| APPLICATION NO. | : 17/908839 | |
| DATED | : November 4, 2025 | |
| INVENTOR(S) | : Oghenekome Oteri et al. | |

It is certified that error appears in the above-identified patent and that said Letters Patent is hereby corrected as shown below:

In the Claims

Column 53, Line 59, delete "first DCI;" and insert --DCI--.

Signed and Sealed this
Twenty-third Day of December, 2025

John A. Squires
*Director of the United States Patent and Trademark Office*